United States Patent
Oqab et al.

(10) Patent No.: US 11,988,178 B2
(45) Date of Patent: May 21, 2024

(54) SYSTEM AND METHODS FOR PROPULSION AND POWERING SYSTEMS USING RECYCLABLE METALLIC FUELS

(71) Applicant: Oqab Dietrich Induction Inc., Kitchener (CA)

(72) Inventors: Haroon B. Oqab, Kitchener (CA); George B. Dietrich, Kitchener (CA)

(73) Assignee: Oqab Dietrich Induction Inc., Kitchener (CA)

( * ) Notice: Subject to any disclaimer, the term of this patent is extended or adjusted under 35 U.S.C. 154(b) by 0 days.

(21) Appl. No.: 18/260,332

(22) PCT Filed: Jan. 4, 2022

(86) PCT No.: PCT/CA2022/050005
§ 371 (c)(1),
(2) Date: Jul. 4, 2023

(87) PCT Pub. No.: WO2022/140865
PCT Pub. Date: Jul. 7, 2022

(65) Prior Publication Data
US 2024/0052800 A1    Feb. 15, 2024

Related U.S. Application Data

(60) Provisional application No. 63/133,751, filed on Jan. 4, 2021.

(51) Int. Cl.
*F02B 43/08*    (2006.01)
*C06B 33/00*    (2006.01)
(Continued)

(52) U.S. Cl.
CPC ............ *F02M 27/02* (2013.01); *C06B 33/00* (2013.01); *C10L 5/40* (2013.01); *C10L 9/02* (2013.01);
(Continued)

(58) Field of Classification Search
CPC ..... F02K 9/24; F02K 9/70; F23B 2900/00003
(Continued)

(56) References Cited

U.S. PATENT DOCUMENTS 4,248,048 A * 2/1981 Smith, Jr. ............... F02G 1/055
60/645
9,249,757 B2 * 2/2016 Zauderer .................. G21C 1/07
(Continued)

FOREIGN PATENT DOCUMENTS

CN    106939829 B    3/2019
JP    2012002492 A    1/2012

OTHER PUBLICATIONS

International Search Report and Written Opinion issued on corresponding PCT International Patent Application No. PCT/CA2022/050005, dated Mar. 22, 2022.

*Primary Examiner* — Long T Tran
*Assistant Examiner* — James J Kim
(74) *Attorney, Agent, or Firm* — Own Innovation; James W. Hinton

(57) ABSTRACT

Provided are systems and methods for propulsion and powering systems using recyclable metallic fuels. The method includes capturing fuel products, including a metal oxide and unburnt fuel from combustion of a metallic fuel, storing the unburnt metallic fuel and the fuel products to generate power and/or thrust, and recycling the metal oxide to recreate the metallic fuel and/or byproducts. A system for propulsion and power generation using a metallic fuel includes a combustion chamber for combusting the metallic fuel to provide propulsion, a reaction chamber for generating electricity and thermal power using heat from unburnt metallic fuel and fuel products, a storage system for capturing the unburnt metallic fuel and the fuel products and at least one recycling system for directing the captured unburnt (Continued)

metallic fuel and/or the fuel products to the combustion chamber and/or the reaction chamber.

20 Claims, 29 Drawing Sheets

(51) Int. Cl.
    *C10L 5/40*          (2006.01)
    *C10L 9/02*          (2006.01)
    *F02M 27/02*        (2006.01)
    *F23K 1/00*         (2006.01)

(52) U.S. Cl.
    CPC ........ *F23K 1/00* (2013.01); *C10L 2200/0204* (2013.01); *C10L 2200/0254* (2013.01)

(58) Field of Classification Search
    USPC .............................................................. 123/3
    See application file for complete search history.

(56) References Cited

U.S. PATENT DOCUMENTS

| | | | |
|---|---|---|---|
| 9,688,898 B2 * | 6/2017 | Hyde | ....................... C09K 5/16 |
| 2018/0371577 A1 | 12/2018 | Stuart et al. | |

\* cited by examiner

Carbothermal Reduction: $MOx + CH_4 \rightarrow CO + 2H_2 + M$

Methanation: $CO + 3H_2 \rightarrow CH_4 + H_2O$

Electrolysis: $H_2O \rightarrow 2H_2 + \frac{1}{2} O_2$

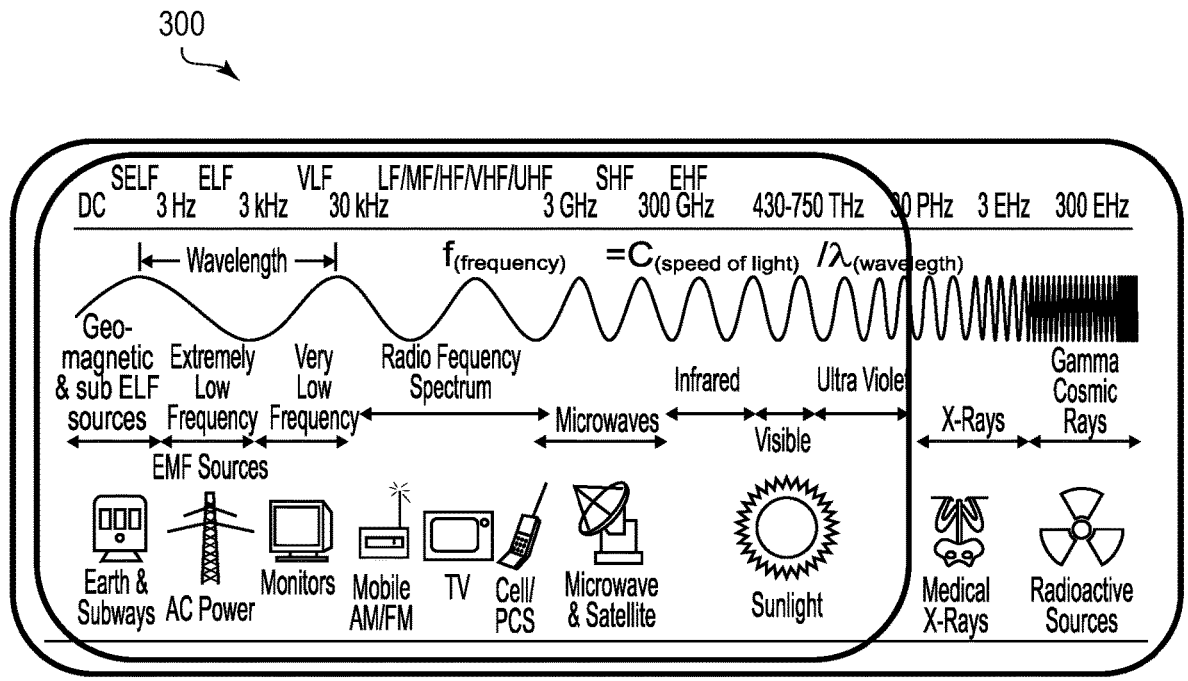

Aeronautical Application

SELF, ELF, VLF, LF, MF, HF, VHF, UHF, SHF, EMF, Geo-Magnetic & Sub ELF Sources
- Extremely Low Frequency
- Very Low Frequency, Radio Frequency Spectrum
- Microwaves
- Infrared
- Visible light
- Ultra Violet
- Sunlight Astronautical Application SELF, ELF, VLF, LF, MF, HF, VHF, UHF, SHF, EMF, Infrared, Visible Light, Ultra Violet, Sunlight X-Rays, Gamma Rays & Cosmic Rays
- Geo-Magnetic & Sub ELF Sources
- Extremely Low Frequency
- Very Low Frequency, Radio Frequency Spectrum
- Microwaves
- Terahertz
- Infrared
- Visible light
- Ultra Violet
- Sunlight
- X-Rays
- Gamma Rays
- Cosmic Rays

FIG. 6

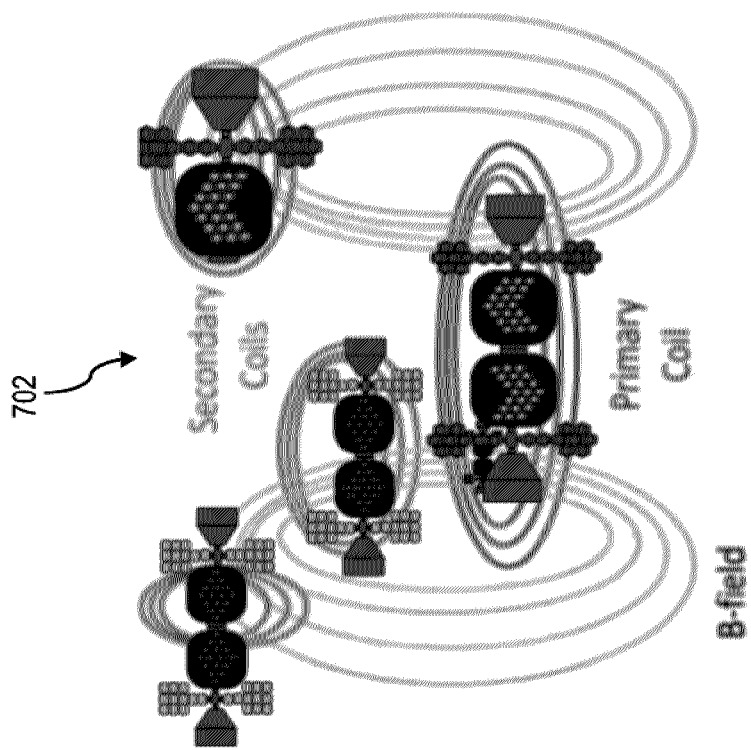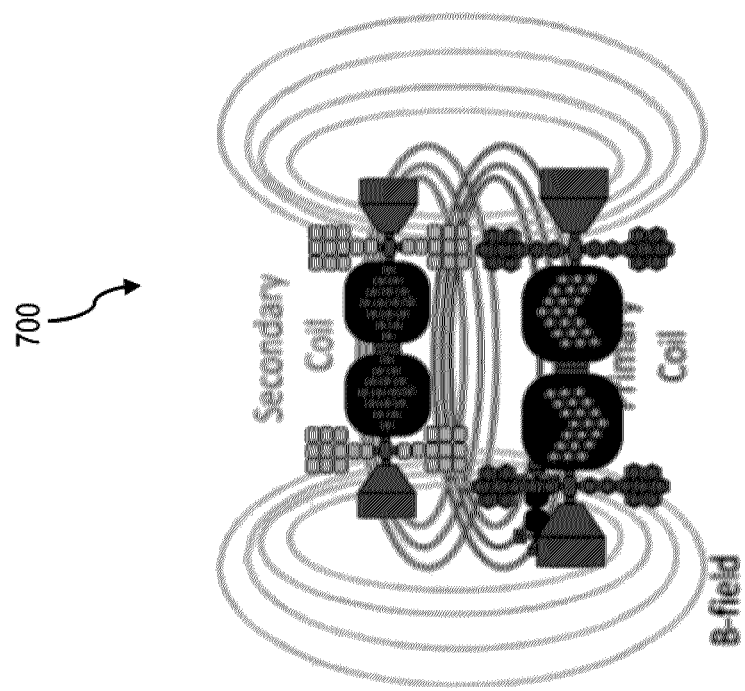
FIG. 12A

SYSTEM AND METHODS FOR PROPULSION AND POWERING SYSTEMS USING RECYCLABLE METALLIC FUELS

TECHNICAL FIELD

The embodiments disclosed herein relate to fuel for propulsion and/or powering systems at a range of scales and, in particular to systems and methods for propulsion and power generation, synthesis and manufacturing, utilization, recycling, transportation, storage, distribution and management of recyclable fuels.

INTRODUCTION

Dependence on fossil fuels is driving an environmental crisis by increasing concentrations of atmospheric greenhouse gases, which studies link to elevating average global temperatures and accelerating disruptive climate change. On the other hand, standards of living are directly correlated with per capita energy consumption, with the result that the desire to improve quality of life prompts consumption of higher and higher levels of energy per person. These circumstances, coupled with a continually growing population, consequently drive global energy requirements for clean renewable energy sources to be scaled up to meet demand while simultaneously replacing fossil fuels use for the largest energy needs including transportation and/or electrical and/or thermal power generation.

In addition, in-space powering and propulsion of space systems using existing, conventional fuels (including solid and liquid propellant) is costly and impractical for use over large distances or for long time periods given the weight/volume requirements and other challenges of storing fuel onboard. Transporting fuel to from Earth to orbit, and point to point travel in space, is also problematic given the high volatility of most conventional fuels and is further limited by size/weight requirements of spacecraft and/or launch vehicles. A further limitation is the range of a spacecraft is restricted by the amount of fuel carried onboard, and once fuel reserves are depleted, the spacecraft can no longer propel itself.

Fuels such as metallic fuels can be used for heating and combustion as an alternative energy source to meet energy demands on Earth and in Space. Metals have high energy densities as such can be used in many batteries, energetic materials, and/or propellants. Oxidation of metal powders can be used as an efficient energetic carrier and source for a number of applications. The exothermic reaction between the metal and an oxidizer release heat and generates products such as metal oxides. Metal oxides can themselves be combusted in the form of nano or micro thermites. In an implementation, by using the energy release to accelerate a fluid within a rocket nozzle and/or create heat for a heat engine, thrust may be generated. In another implementation, by using the energy release to heat a fluid within an electrical and/or thermal power generation system, power may be generated. In more general cases, a metal and an oxidizer, often air and/or water, is used as the carrier, and as the source of oxidation of the metal. In other cases, the fuel and oxidizer, in the form of a thermite, can be both located in a metallic particle (for example a metal oxide coat on the outside of a metal particle). In either case these can be referred to as the metallic fuels (such as metal, metallic, and/or energetic particles, thermites and/or micro, and/or nano-thermites, or the like).

Metallic fuels may contain energetic particles which are made up of a fuel and an oxidizer—typically a metal and a metal oxide, respectively. Nanothermites are composed of both the oxidizer and fuel compose each particle—which are on the scale of 100 nanometers or below—the energy release per mass of particle is very large. In an implementation, using metallic fuel propellant including nanothermites or microthermites, or a combination thereof, may be used in any inert carrier gas and or liquid to disperse the propellant within the combustion chamber for an effective heating and/or combustion, leading to well-controlled power and thrust generation.

Metallic fuels (e.g., thermites, microthermites, nanothermites) have high energy density, and when mixed with an inert gas and/or liquid carrier fluid, are generally safer to handle and transport than conventional fuels. They can be synthesized and manufactured, and transported to be used and/or stored for future use. Propellants can be produced, stored and transported for dispatchable power. Stored energy can be in the form of fuels can be used to generate power and propulsion.

Metallic fuels can be heated in a thermal power plant to generate steam to drive the production of electricity. Metallic fuels can also be combusted in a rocket engine for propulsion. Products of nanothermite reactions are themselves a clean energy source of metals and/or metal oxides that can be captured, used and/or recycled. The products and/or byproducts of heating and combustion of fuels may be captured and recycled using terrestrial power generation systems employing renewable energy sources (e.g., solar, wind, thermal, nuclear, power beaming or the like).

Accordingly, there is a need for new wireless power transmission and power beaming and or distribution systems and methods for coupling to and augmenting the propulsion and power generation using metallic and recyclable metallic fuels.

SUMMARY

According to some embodiments, there is a method for recycling metallic fuels. The method comprises capturing fuel products including a first metal oxide and unburnt fuel from heating and/or combustion of a metallic fuel, directing the unburnt metallic fuel and the fuel products for storage and/or further oxidation to generate power and/or thrust; and recycling the first metal oxide to create the metallic fuel and/or byproducts. The method may include controlling volumetric heating of the metallic fuel to regulate combustion in a heat engine.

According to an embodiment, the method may further include inductively generating electricity using heat from the unburnt metallic fuel and the fuel products. The fuel products produced by combustion of the metallic fuel may include a metal that is oxidizable for heating and/or combustion. The method may further include recycling the fuel products by one or more chemical processes to produce a usable byproduct. The method may include synthesizing the metallic fuel from a plurality of fuel sources harvested from the Moon, Mars, other planets, asteroids, planetoids, other celestial bodies, or a combination thereof.

According to some embodiments, there is a system for in-space propulsion and power generation using a recyclable metallic fuel. The system comprises at least one combustion chamber for heating and/or combusting the metallic fuel to provide propulsion and at least one reaction chamber for generating electricity and thermal power using heat from unburnt metallic fuel and fuel products. The system further includes at least one storage system for capturing the unburnt metallic fuel and the fuel products and at least one recycling system for directing the captured unburnt metallic fuel and/or the fuel products to the at least one combustion chamber and or the at least one reaction chamber.

According to an embodiment, the at least one reaction chamber integrates a thermophotovoltaic system to convert heat from the unburnt fuel and the fuel products into electricity. According to an embodiment, the system may further include a second recycling system for directing the fuel products to a second reaction chamber for processing the fuel products into byproducts.

The system may further comprise one or more inflatable modules for storing the metallic fuel, the unburnt metallic fuel and the fuel products. They system may further include a magnetic induction coil for wireless power transfer.

According to various embodiments, space-based systems for in-space power generation and propulsion (e.g., space solar, nuclear fission, nuclear fusion, chemical reaction, thermal reaction, stored energy, space-based solar power, wireless power transmission, directed power and/or power beaming systems) may be employed to collect and recycle fuel products and byproducts to generate, store and/or distribute power, energetic materials and propellants. Metallic fuels can be burned with gases, liquids, or other solids or reacted with water to release their chemical energy at a range of in-space power- and propulsion-generation scales. In other implementations, space debris and/or other space systems (e.g., satellites, second stages or the like) may be also recycled and turned into useful products and services. In other implementation, in situ space utilization may be employed where space resources, including a plurality of fuel sources found on the Moon, Mars, other planets, asteroids, planetoids, and other celestial bodies, or a combination thereof is recycled like a metallic fuel. In other implementations metallic fuels can be used and the energy generated many be wirelessly transferred. Other implementations may include the wasted heat generated through propulsion and power generation can be converted directly to electricity in a photovoltaic device.

Other aspects and features will become apparent, to those ordinarily skilled in the art, upon review of the following description of some exemplary embodiments.

BRIEF DESCRIPTION OF THE DRAWINGS

The drawings included herewith are for illustrating various examples of articles, methods, and apparatuses of the present specification. In the drawings:

FIG. 6 is a diagram of the electromagnetic spectrum showing wavelengths for wireless energy transmission;

FIGS. 12A-12B are diagrams of in-orbit inductive-coupled magnetic resonance wireless power transfer systems, according to several embodiments;

DETAILED DESCRIPTION

Various apparatuses or processes will be described below to provide an example of each claimed embodiment. No embodiment described below limits any claimed embodiment and any claimed embodiment may cover processes or apparatuses that differ from those described below. The claimed embodiments are not limited to apparatuses or processes having all of the features of any one apparatus or process described below or to features common to multiple or all of the apparatuses described below. Drawings are for illustration purposes only and are not drawn to scale.

Figure 1A:
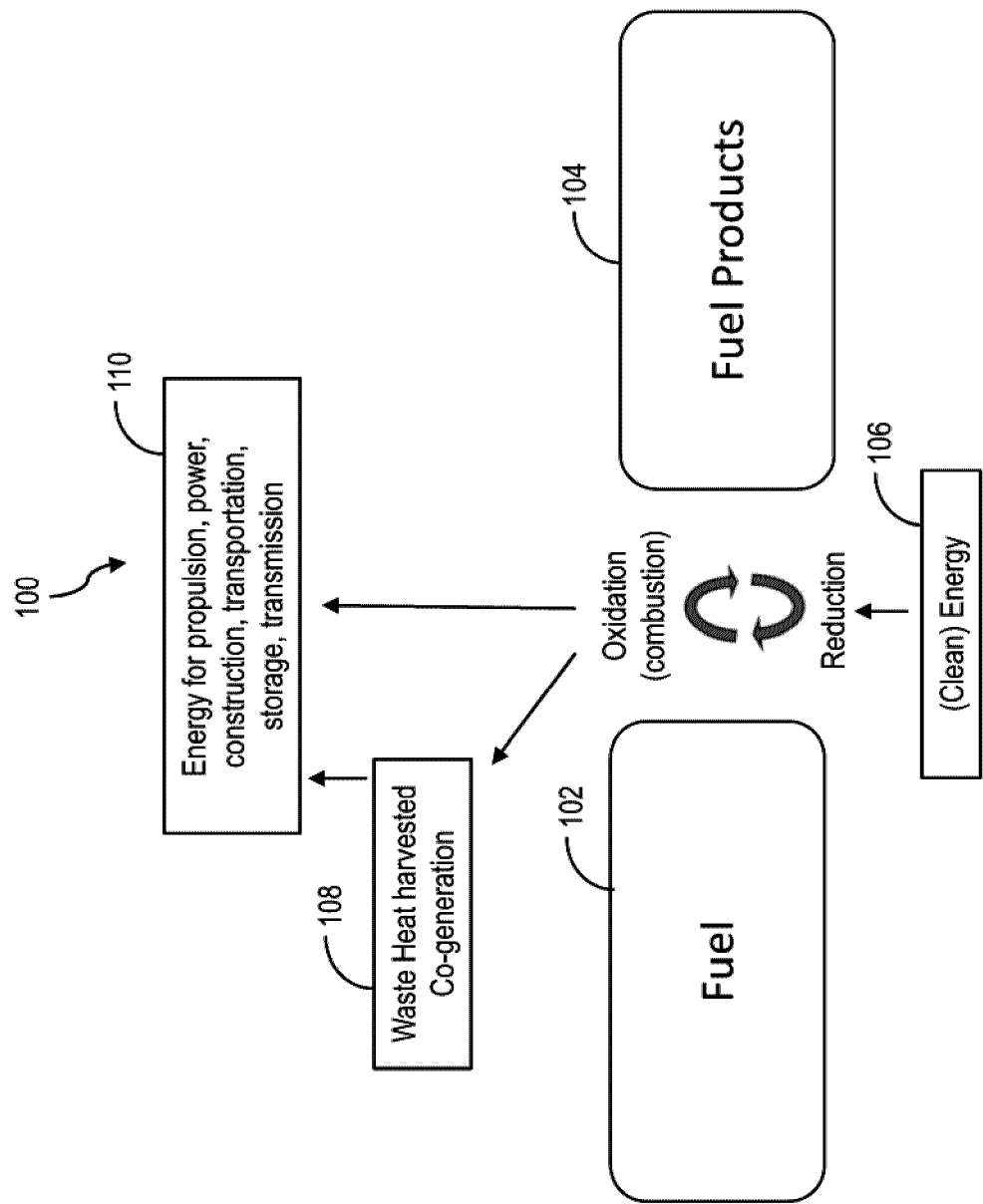
FIG. 1A is diagram of fuel recycling for power and propulsion, according to an embodiment.

Referring to FIG. 1A, shown therein is a diagram of fuel recycling 100 for power and propulsion. A fuel 102 is heated/combusted (oxidized) to generate energy 110 for propulsion, power, construction, transportation, storage or transmission (dispatchable power) and waste heat 108 may be harvested to co-generate further energy 110. Fuel products 104 generated by oxidation of the fuel 102 are captured and recycled back into usable fuel 102 by reduction. Reduction of fuel products 104 requires an input of energy 106. It may be particularly advantageous to use terrestrial and in-space renewable energy sources to provide the input of energy 106 required for reduction of the fuel products 104.

Figure 1B:
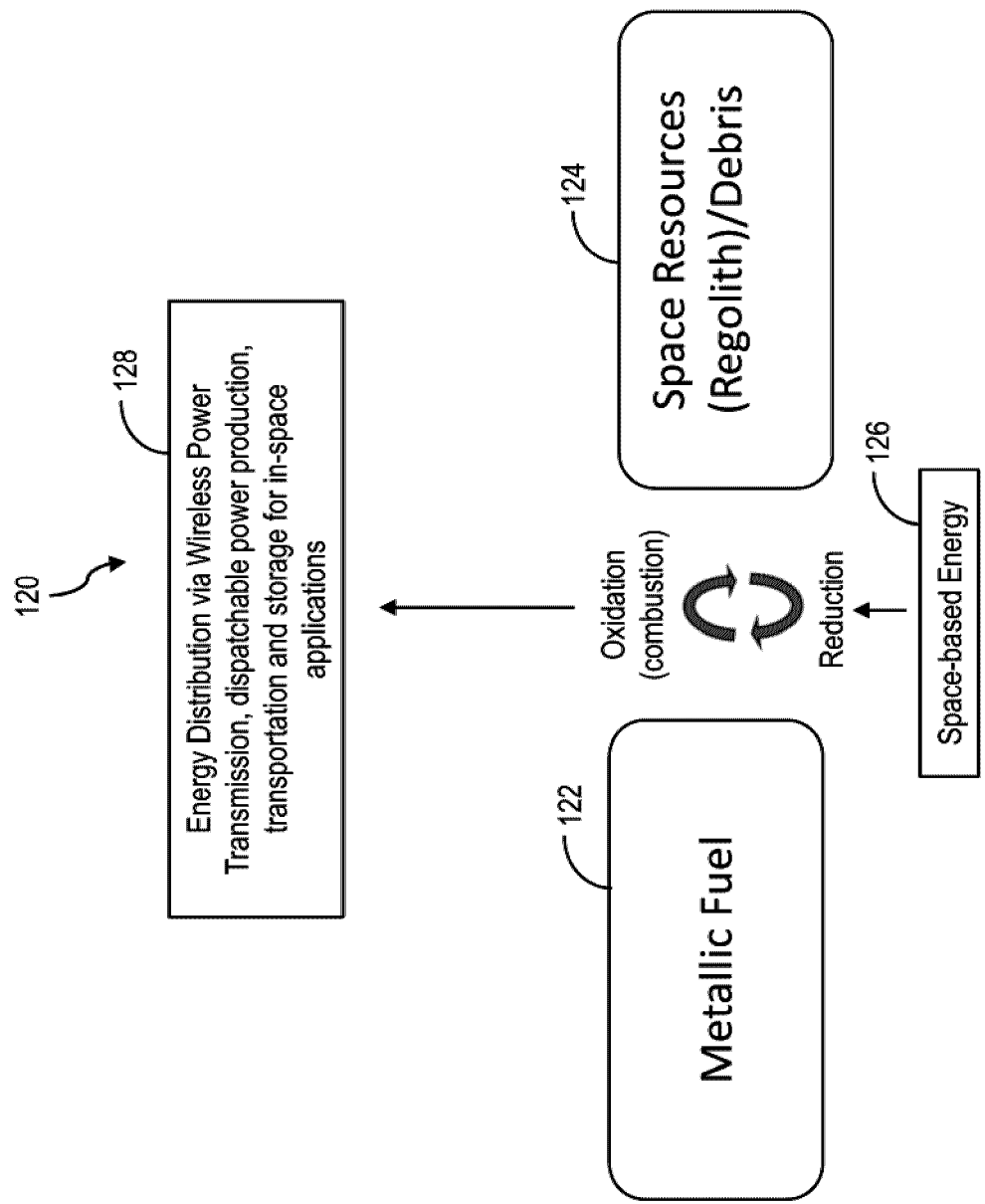
FIG. 1B is a diagram of in-space fuel recycling, according to an embodiment.

The fuel recycling 100 shown in FIG. 1A may be adapted for use on Earth and in Space. According to an embodiment, the fuel 102 (e.g., a nanothermite) is heated and/or combusted to accelerate a fluid within a rocket nozzle and/or create heat for heat engine to generate thrust (FIG. 1B). According to another embodiment, the fuel 102 is heated and/or combusted to heat a fluid within an electrical and/or thermal power generation system, and power may be generated for energy distribution (FIG. 1B). According to other embodiments, the fuel 102 is heated and/or combusted to synthesis and produce metal and metal oxides for transportation, manufacturing of other byproducts and/or storage (FIG., 1C).

Referring to FIG. 1B, shown therein is a diagram of in-space fuel recycling 120. A metallic fuel 122 (e.g., a nanothermite) may be burned to provide propulsion of spacecraft (rockets, non-rocket launch systems e.g., balloons, impulse drivers, or other satellite propulsion systems, etc.) and generate energy 128 for in-space applications. The metallic 122 fuel may be synthesized from in-space resources (regolith)/debris 124 using an input of space-based energy 126. It may be particularly advantageous to use solar energy in space, and/or solar power satellites wherein wireless power transmission and/or power beaming are coupled to renewable energy sources to provide the input of energy 126 required for in-space reduction of space resources/debris 124. For example, energy (electromagnetic radiation) may be beamed from earth to space to power in-space fuel recycling 120 using systems and methods for wireless power transmission, as disclosed in PCT/CA2021/050985 filed Jul. 15, 2021 and having a priority date of Jul. 15, 2020 and to the same applicant, which is incorporated by reference herein, in its entirety. In-situ resource utilization (ISRU) may also be employed to harvest regolith 124 in-space which is then transformed for in-space metallic fuel synthesis and recycling. Space debris 124 may also be recycled and turned into metallic fuels 122 and other useful byproducts using the systems and methods described. The metallic fuels 122 may be transported for use and distribution at other locations and/or stored for later use.

Figure 1C:
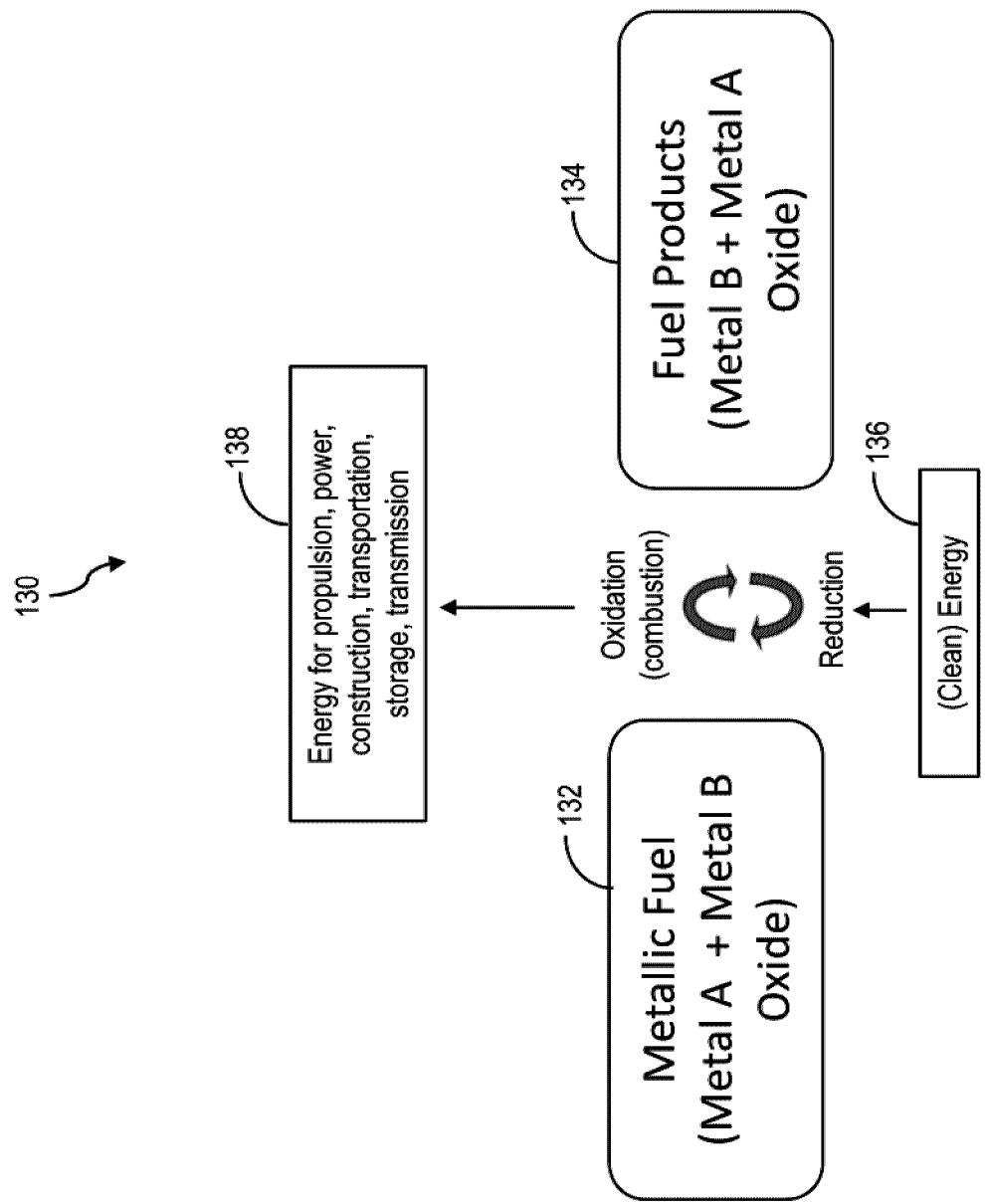
FIG. 1C is a diagram of fuel recycling to produce useful byproducts, according to an embodiment.
Figures 1D, 1E:
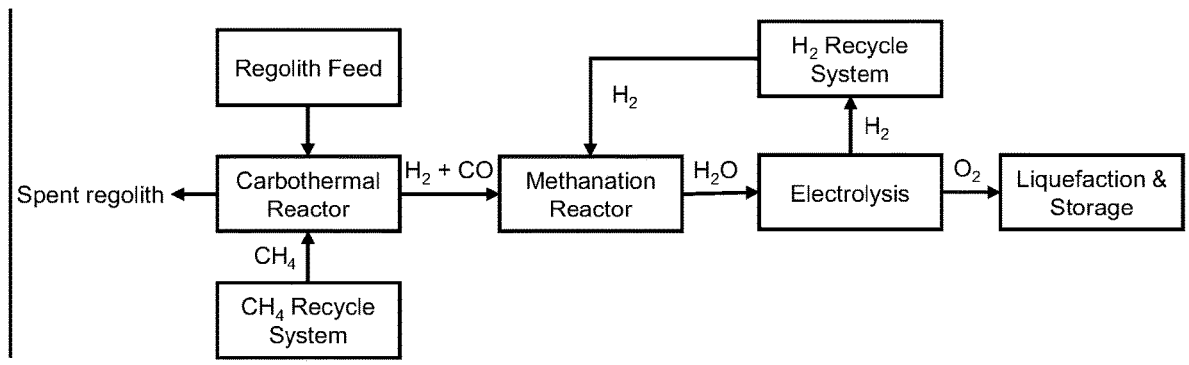
FIG. 1D is chemical equations for reductive processes.
FIG. 1E is a diagram of in-situ (in-space) resource utilization process for regolith synthesis and transformation.

Referring to FIG. 1C, fuel products 134 may be captured, transported and/or recycled. Reduction of the fuel products 134 to generate recyclable metallic fuel 132 can be achieved through known processes such as carbothermal reduction, methanation and electrolysis (see FIG. 1D). Other processes may also be used such as hydrogenation to produce other useful "byproducts." For example, the "Metal A Oxide" fuel product 134 may be recycled and used in other applications such as additive manufacturing, or it can be reduced into metallic fuel 132 by a process that creates other useful "byproducts" including, but not limited to hydrogen, methane, water, oxygen, or the like (see FIG. 1E) which can be stored for other applications on Earth and in Space. Similarly, the "Metal B" fuel product 134 is itself a metallic fuel which can be further oxidized using air or water or another oxidizer for energy and power production. It should be noted that "Metal A" and "Metal B" may be different metals, or may be same metal having different oxidation states (i.e., varying valency).

Figure 2:
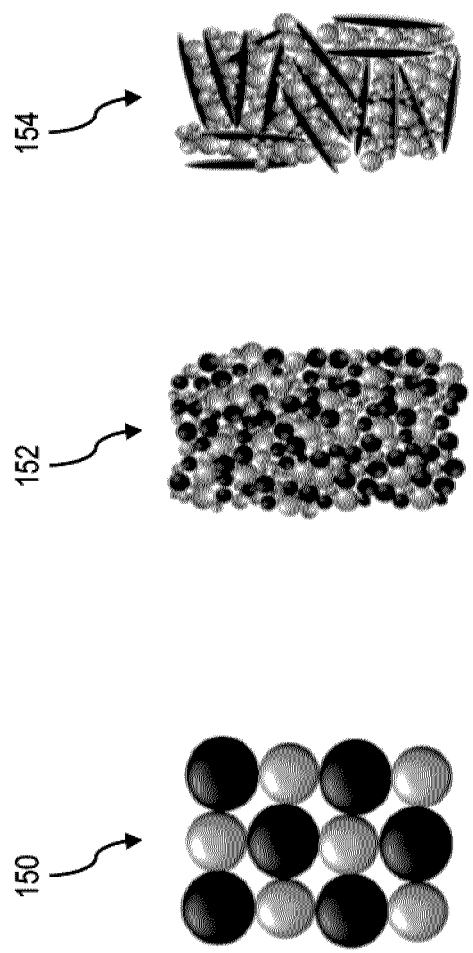
FIG. 2 is diagrams of exemplary thermites.
Figure 3:
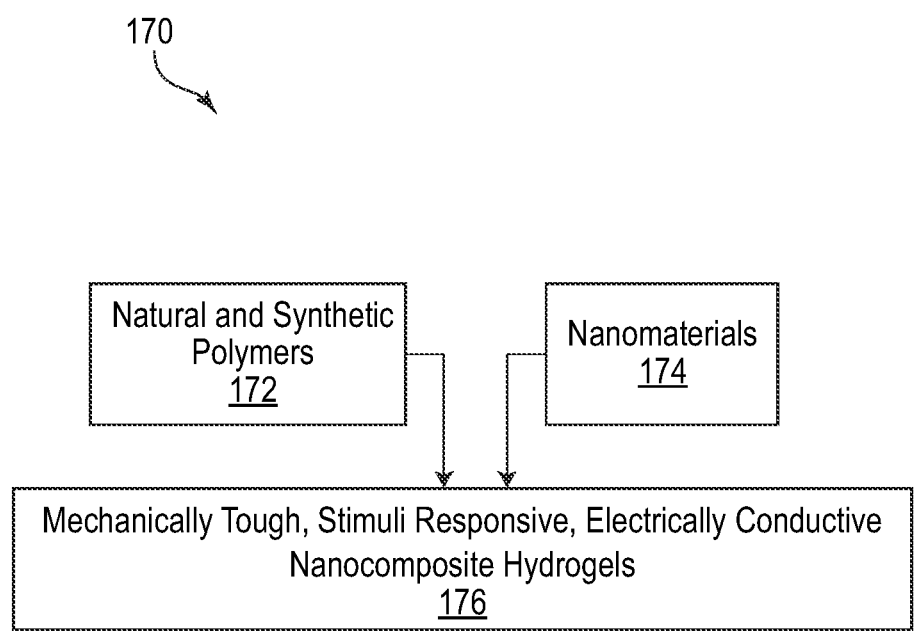
FIG. 3 is a diagram of nanocomposite hydrogel synthesis.

Fuel 102 sources may include one or more of: reactive metal compounds (e.g., thermites, microthermites, nanothermites) (FIG. 2); materials with magnetic properties; a mixture of layers of metals; multicoated metals with metamaterials (FIGS. 4A, 4B); hybrid mixtures of reactive metal compounds in liquid and inert states; in-situ space resources (e.g., regolith); ceramic precursors; conductive pastes; natural and synthetic fibers (FIG. 3); and hydrogels (FIG. 3). Fuel 102 sources may be in solid (powdered), liquid, or gaseous state.

Other fuel sources many include thermoplastics and/or other terrestrial waste products, such as cellulosics (e.g., toys, lamp shades, partition, shelf covers, storage boxes, ice crushers, juicer bowls, vacuum parts, tool handles, pipes, eyeglass frames), nylon (e.g., slide fasteners, combs, brushes and bristles, baby dishes, funnels, salad spoon and fork, washer gaskets), polyethylene (squeeze bottles, ice trays, toys, storage boxes, flashlights, wiring, pipes, kitchenware (film or coating, semi-rigid, rigid), vinyl (raincoats, upholstery, tiles, inflatable curtains, toys, luggage, baby clothes, records (film, sheeting, semi-rigid, rigid, coating), acrylic (bowls, trays, partitions, roofing, handbags, eyeglasses, light fixtures, table appointments, bookends, dresser sets, window glazing, picture frames), or the like.

The fuel 102 may be synthesized from one or more fuel sources by hybrid synthesis methods, including: additive manufacturing, physical mixing, chemical reactions, emissive and missive methods, vapor deposition, pyrolysism microwave-assisted synthesis, ball milling, exfoliation, sonochemical techniques, arc-discharge, or a combination of thereof adapted for space applications.

The fuel 102 may be heterogeneous having two or more components with distinct properties, for example, hard metallic particulates and a soft binder for cohesion and flow. Heterogenous fuel 102 may beneficially provide a large contact surface area and internal/external frictional resistance to flow. Heterogeneous fuel 102 may include particles of different length and size scales.

Referring to FIG. 2, shown therein are exemplary thermites 150, 152, 154. Thermites are a metastable intermolecular composite made up of a fuel, typically a metal (shown in dark shading), and an oxidizer, typically a metal oxide (shown in light shading). As the thermite includes both the oxidizer and metal fuel, the energy released per unit mass is very large. Thermite particles can range in size from a microthermite 200 on the scale of hundreds of micrometers to a nanothermite 152 on the scale of 100 nanometers of less. Nanometer-scale ordered thermite 154 is another variant.

Referring to FIG. 3, shown therein is a diagram of nanocomposite hydrogel synthesis 170. Natural or synthetic polymer sources 172 are combined with nanomaterials 174 (e.g., nanothermites) to produce nanocomposite hydrogels 176. The resulting hydrogel 176 is mechanically strong, electrically conductive and responsive to stimuli. The hydrogel 176 may be synthesized as a simple linear-chain structure or a crosslinked structure.

Figure 4B:
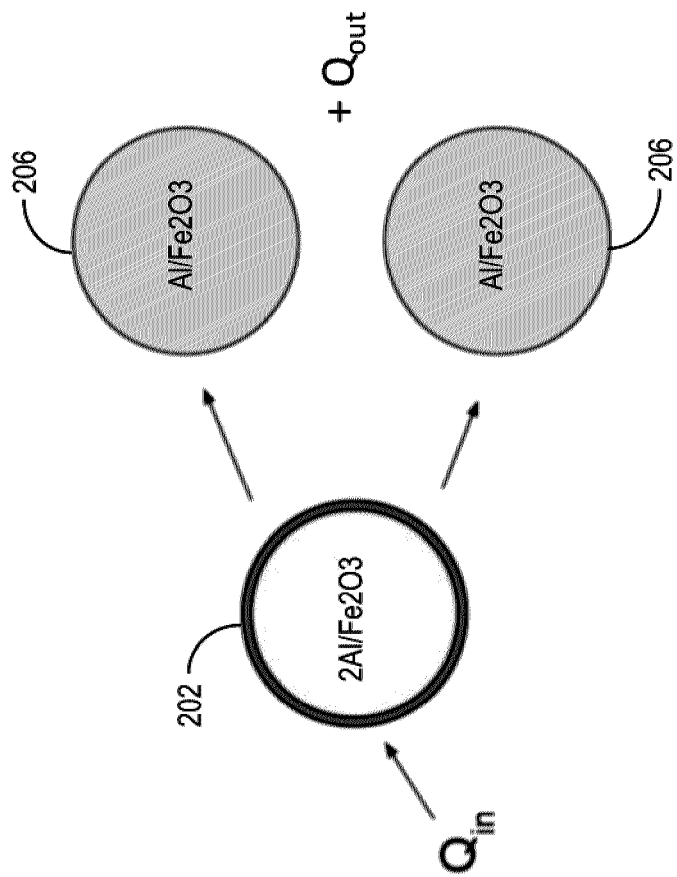
FIG. 4B is a diagram of combustion of the nanothermite fuel in FIG. 4A.
Figure 4A:
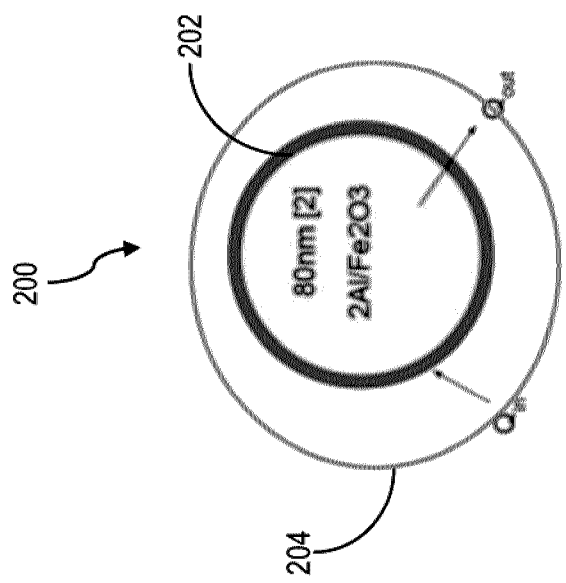
FIG. 4A is a diagram of a heterogeneous nanothermite fuel.

Referring to FIG. 4A, shown therein is a diagram of a heterogeneous fuel 200. The heterogenous fuel 200 may be the fuel 102 in FIG. 1A. The fuel 200 includes a nanothermite particle 202 composed of $2 \times Al/Fe_2O_3$ particles. The nanothermite particle 202 is wrapped in a binder 204 in a core-shell arrangement. The binder 204 may be a hydrogel (e.g., hydrogel 176) or a metamaterial (e.g., a self-assembled nanomaterial, nanocarrier nanowires, or the like). The composition of the binder 204 may be application specific.

The fuel 200 may be burned/combusted in a thermal power plant. As shown in FIG. 4B, an input of thermal energy causes the nanothermite particle 202 to heat or combust into individual thermite particles 206 and release thermal energy, which can propagate further combustion.

The heat generated, may be converted to electric power through heat transfer and inductive heating. Waste heat may also be harvested and turned into electricity, using for example, a thermophotovoltaic device.

Combustion of metallic fuels produce a solid-phase fuel product. For example, in nanothermite coreshell combustion, an Aluminum/Iron Oxide coreshell is combusted producing Aluminum Oxide ($Al_2O_3$) and Iron. The Aluminum Oxide and Iron may be captured and recycled for reuse. The Aluminum Oxide may be used to additively manufacture useful products, whereas the Iron is oxidized further and used as a metal fuel, where its metal oxide products may be further captured and recycled as fuel. The captured byproducts may be recycled using renewable terrestrial energy, stored energy, energy harvested from the environment (i.e., solar) or using energy received from wireless power transmission systems.

Capturing of fuel products for storage, and recycling may be achieved using known capture techniques adapted for use on Earth and in Space. For example, on Earth, the metal oxide and the metal fuel products may be captured by gravity-separation in a reaction vessel. In space (a zero-gravity environment), the metal oxide and the metal fuel products may be mixed with an inert carrier fluid in the reaction chamber and magnetohydrodynamic separation may be performed to capture the fuel products according to charge.

Figure 5:
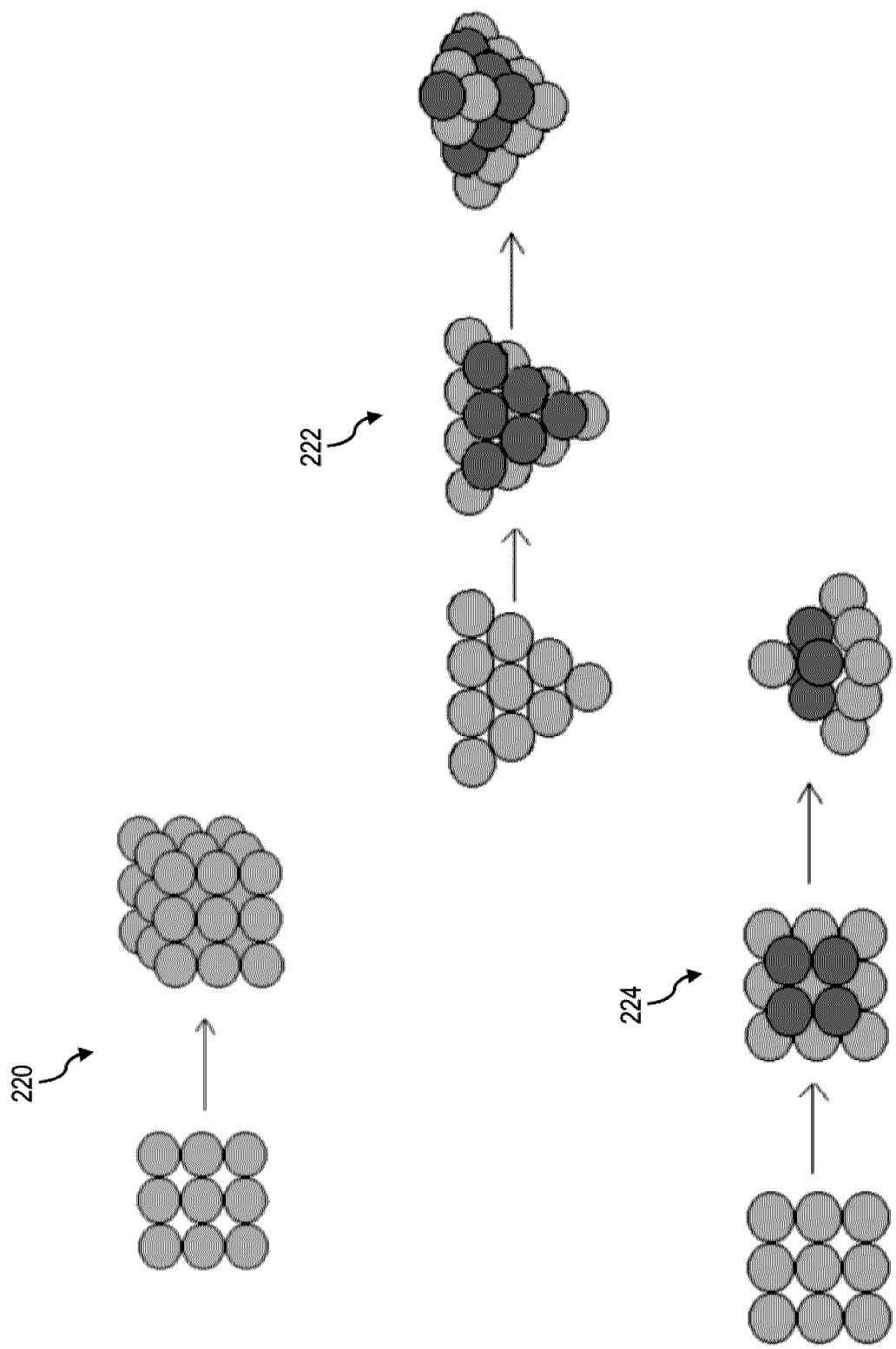
FIG. 5 is diagrams of packing configurations for fuel particles.

Referring to FIG. 5, shown therein are packing configurations 220, 222, 224 for fuel particles. Each ball (light and dark shading) represents a fuel particle. The fuel particles may be a heterogeneous fuel 200 or composite fuel particle 202. The fuel particles may be arranged in a simple cubic packing 220, a face-centred cubic packing 222, or a hexagonal packing 224. Other configurations, for example, wires, cones, spheres, torus, cylinder, cuboid, prisms, dodecahedron, icosahedrons, pyramids, or the like, are also contemplated. Depending on the application for the fuel, a particular packing configuration may be selected. A specific application may also dictate the shape, size, surface charge, surface area, surface functionally, porosity, size distribution, structure and composition of the fuel particles.

Packing of fuel particles may also provide for catalyst-based controlled release systems, wherein a catalyst is included with the fuel. The catalyst may be combined with fuel particles as a conjugate, as a matrix-based, or a membrane-based system that is stimuli-responsive, being chemically, mechanically, magnetically, or thermally activatable. The catalyst may also be self-activatable/excitable. A catalyst may be added to fuel particles by grafting, coating or layering methods.

Referring to FIG. 6, shown therein is a diagram of the electromagnetic spectrum showing wavelengths of electromagnetic radiation 300 for wireless energy transmission for aeronautical and astronomical applications. The aeronautical application range 302 includes extremely low frequency (ELF), very low frequency (VLF), microwave, infrared, visible light and ultraviolet radiation. The astronomical application range 304 includes the wavelengths in the aeronautical application range 302 as well as x-ray, gamma and cosmic radiation. Types of radiation that are present in both the aeronautical application range 302 and the astronomical application range 304, for example microwave radiation, may be used for combined aeronautical and astronomical applications such as ground-to-space (and space-to-ground) wireless energy transmission.

In-space applications of wireless power transmission as described herein may include directing power for recharging of space systems (i.e., satellite systems), constellation of satellites in orbit and surface operations of moon bases, rovers, drones, exploration vehicles, space architecture and other lunar structures or the like. Aspects of systems may be used for surface and subsurface operations. Aspects of systems described herein may be used to create a point-to-point network for wireless power and data transfer on bodies such as the Moon, Mars, asteroids, and Earth. Bodies may be orbited by a craft, such as a satellite that may communicate with devices or ground stations present on the surface of each body, such as to enable a large-scale wireless power and data transfer network, accessible on the surface and in the orbit of each body.

Metallic fuels may be used to power satellite propulsion systems (SPS) for maneuvers and station-keeping in a plurality of space applications including around the Earth, cislunar space, the Moon, Mars, and other celestial bodies. Furthermore, metallic fuels may be used to generate electrical energy to power satellite on-board avionics, electronics, rectennas, solar panel deployment/realignment, and other mission-related instruments.

Each satellite has a wireless power receiving/transmitting system such as those disclosed in PCT/CA2021/050985. The satellite may receive power wirelessly beamed up from a surface-based power generation source or a stored power source to power the satellite, recharge batteries and/or recycle captured metallic fuel byproducts into usable metallic fuel using one or more fuel reduction processes. Furthermore, the satellite may wirelessly beam power generated by combustion of metallic fuel to vehicles 338 or buildings on the surface or to another satellite.

A fleet (constellation) of satellites having wireless power systems may thus dynamically recycle fuel to recharge one another as needed. This may be particularly advantageous for free space SPS where other sources of power are unavailable. Similarly, a constellation of satellites in low-earth orbit, middle earth orbit or sunsynchronous orbit, other high orbits, geosynchronous earth orbit or other orbits around earth orbit may dynamically receive/transmit wireless power to recharge and/or recycle fuel without having to break orbit.

Figure 7:
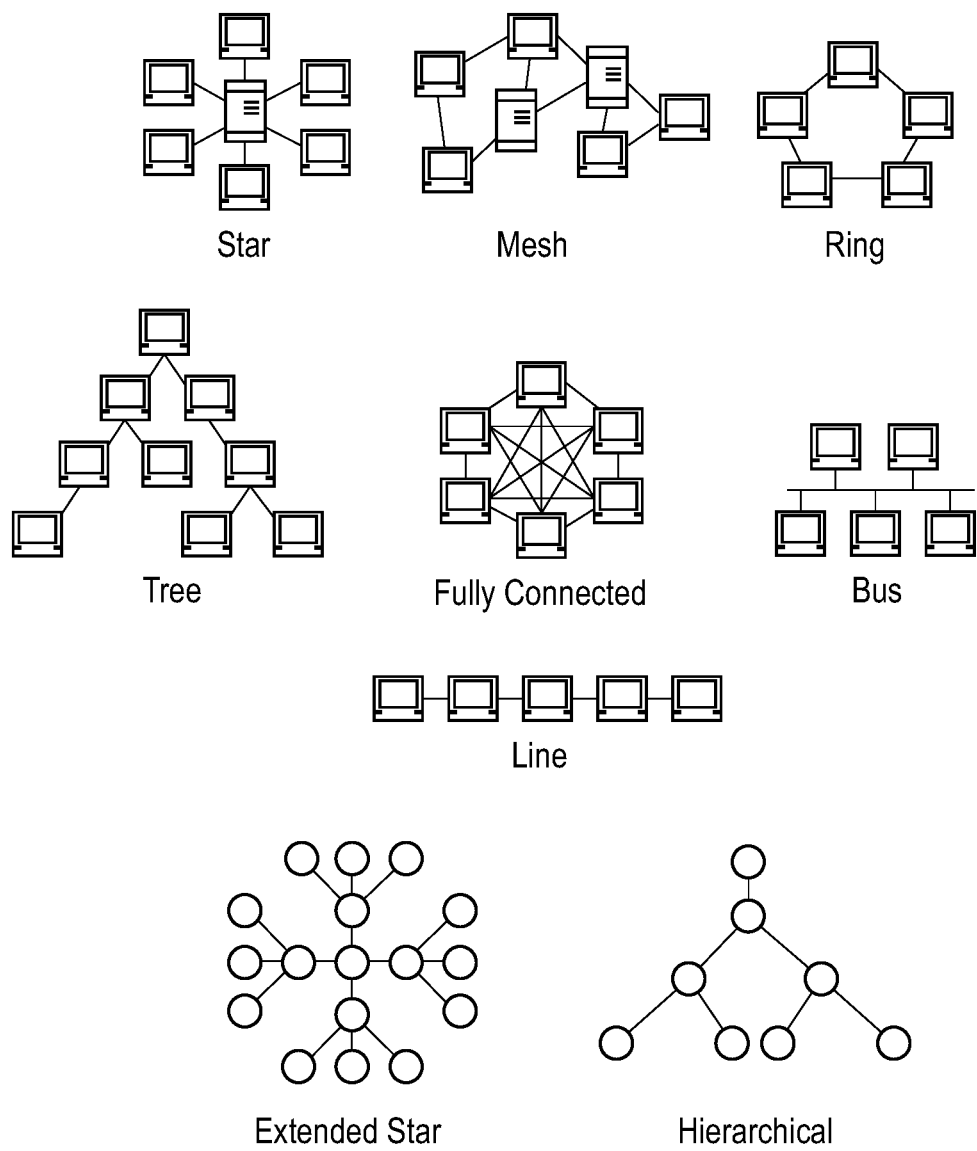
FIG. 7 a diagram of power and data network topologies for wirelessly powering a three-dimensional array of vehicles, according to several embodiments.

Referring to FIG. 7, shown therein is a diagram of power and data network topologies 420 for powering a three-dimensional array of vehicles, for example, a constellation of satellites that could be continuous like a crystalline structure, or random like a flock of birds. The vehicles may be drones, or other aerial craft, satellites, or spacecraft, hereafter referred to as nodes. The nodes may be fixed, mobile or hybrid systems including tethered systems having tethered components on the ground and in the air; or having tethered components in the air and in space. The nodes may transmit and receive power wirelessly and store the power. Charging a distributed array of nodes may be done using one or more of the network topologies 420 shown. Charing power may occur by transferring power from a power source to a node; then node to node (i.e., a power relay system) to dynamically manage power systems to optimize stored energy amongst nodes. Metallic fuels may be transported to a plurality of nodes for power generation and distribution to manage and optimize the power distribution network 420.

Figure 8:
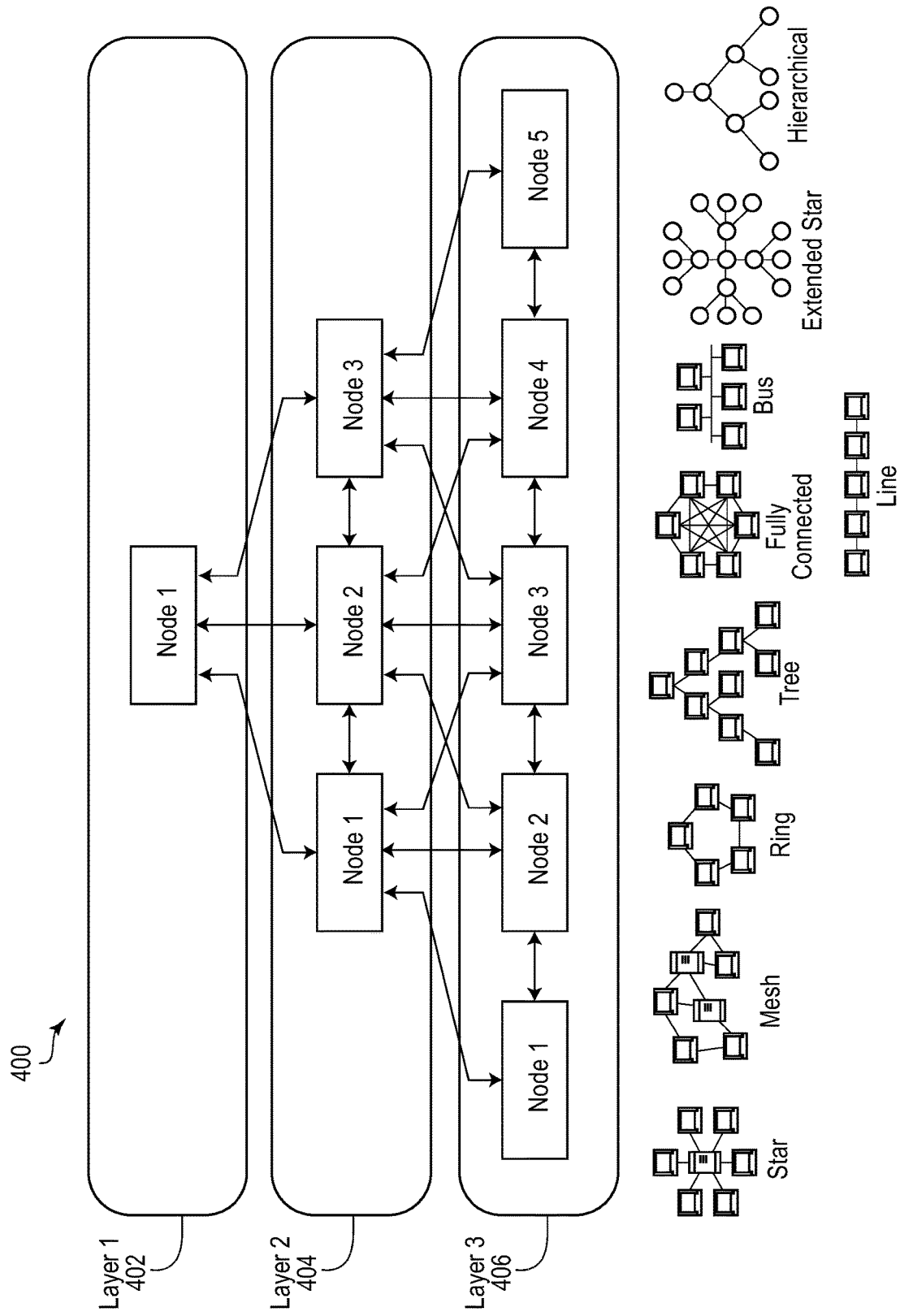
FIG. 8 is a diagram of a multi-orbit, multi-domain network topology for wireless power transmission, according to an embodiment.

Referring to FIG. 8 shown therein is a diagram of a multi-orbit multi-domain network topology 400 for wireless power transmission, according to an embodiment. The network topology 400 includes at least three layers 402, 404, 406 or domains. A first layer 402 includes space and near space nodes, for example, satellites at varying orbital distances. A second layer 404 includes air nodes including aerial craft, for example, drones, balloons and airships. A third layer 406 includes ground nodes including ground power stations, ground based vehicles, etc.

Each node in the multi-domain network topology 400 may transmit and receive power wirelessly and store power for internal use or transmission to other nodes in the same layer or an adjacent layer. Such a network topology 400 may be implemented for point-to-point charging by wireless power transmission between the nodes and/or between domains 402, 404, 406. For example, a constellation of satellites in the first layer 402 may be charged by power beamed from air nodes (e.g., airships) in the second layer 404, which in turn receive power from ground nodes in the third layer 406. Similarly, power may be transmitted from nodes in the first layer 402 to nodes in the third layer 406 via nodes in the second layer 404. Multiple domains 402, 404, 406 may be used to optimize power distribution to support dynamic operations in the network 400. The network 400 may be deployed spanning multiple domains, for example using satellites, pseudo satellite using drones and airships, and or tethered systems.

The network topologies shown in FIGS. 7 and 8 may be implemented for wireless power transmission to power in-space recycling of metallic fuel byproducts into usable metallic fuel for satellite operations as described above. Further applications may include point to point delivery of payloads (e.g., orbital insertion; low earth orbit to geosynchronous earth orbit transport; earth to moon transport; asteroid to earth transport; resupply missions, etc.). Some of these applications are described below.

Figure 9A:
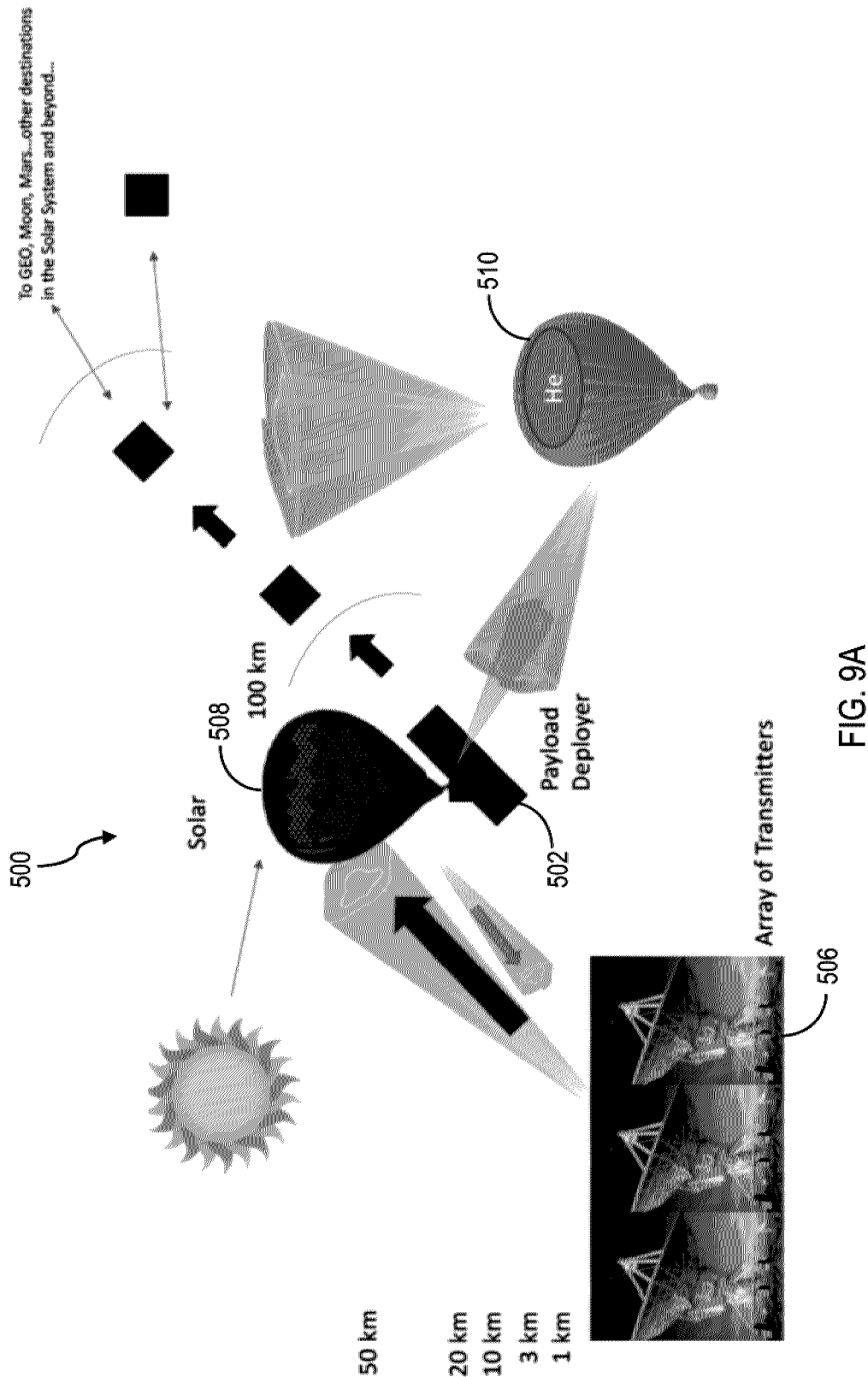
FIGS. 9A-9B are diagrams of a point-to-point payload transfer system, according to an embodiment.
Figure 9B:
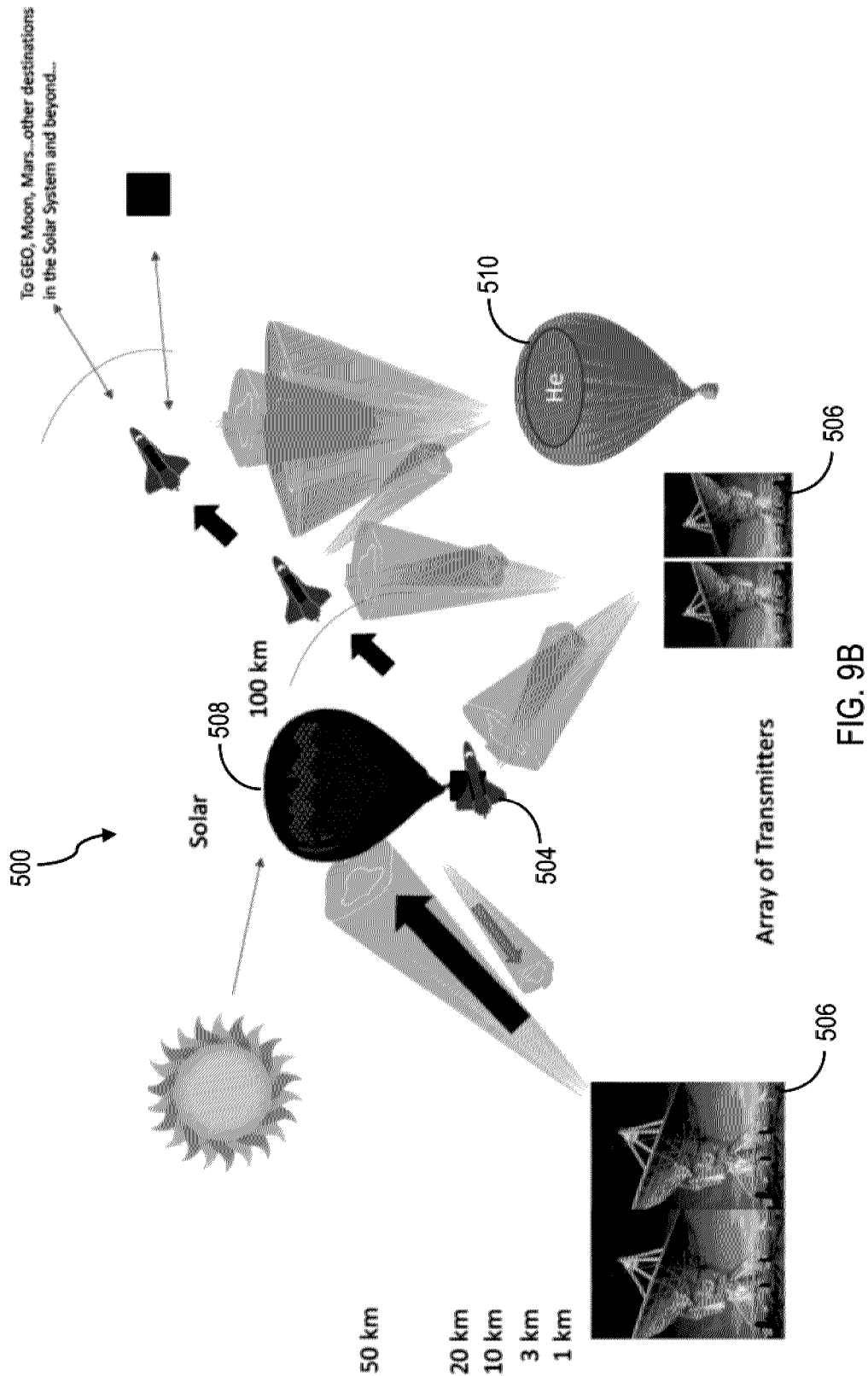

Referring to FIGS. 9A and 9B, shown therein are diagrams of a point-to-point payload transfer system 500, according to an embodiment. The system 500 may be used to transport a payload 502 from the ground to orbit (FIG. 9A) or launch a spacecraft 504 into orbit (FIG. 9B). The system 250 includes an array of ground transmitters 506 for beaming up electromagnetic radiation (wireless power). The system 500 includes a launch balloon 508 for carrying the payload 502 or spacecraft 504. The launch balloon 508 is covered in rectennas to receive the radiation beamed up from the ground transmitters 506 and/or solar radiation to provide the launch balloon 508 with energy for propulsion and lift to carry the payload 502/spacecraft 504. The launch balloon 508 may transport the payload 502/spacecraft 504 up to an altitude of approximately 50 km above the earth. The system 500 includes a secondary airship 510. The secondary airship 510 may track flight path of the launch balloon 508, deployment of payloads 502, 504 and/or interface with satellites in orbit.

Referring to FIG. 9B, the spacecraft 504 may include a heat exchanger (i.e., thermal rectennas) that can use directed power/radiation, from, for example, the secondary airship 510, for power and propulsion once separated from the launch balloon 508.

Figure 10A:
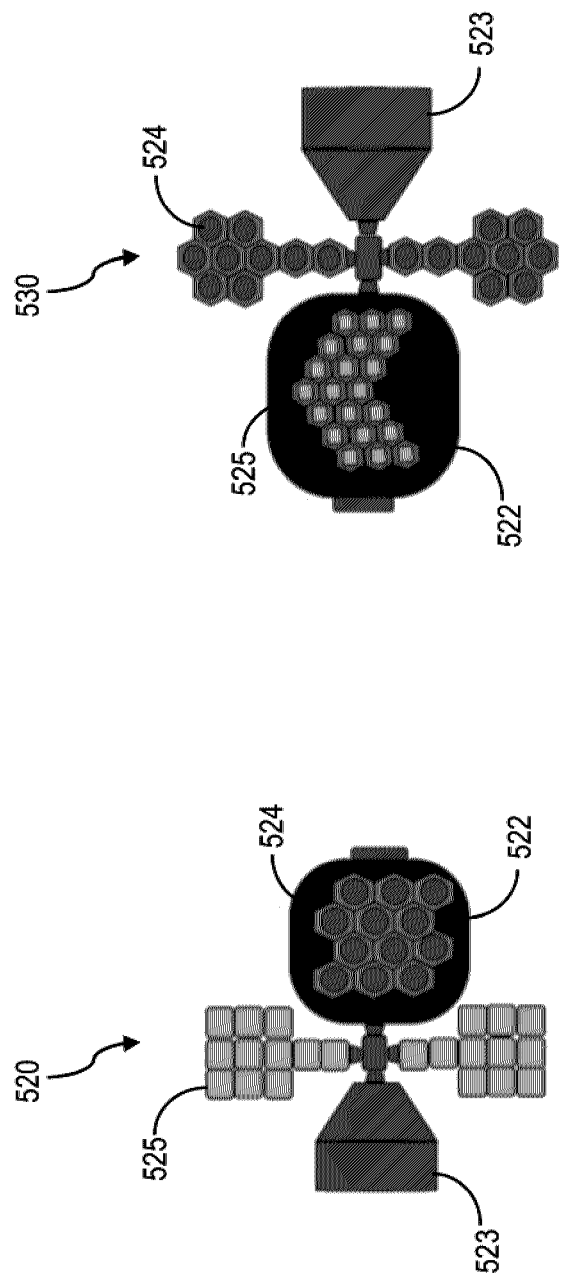
FIG. 10A is diagrams of inflatable, deployable, additively manufactured spacecraft, according to several embodiments.

Referring to FIG. 10A, shown therein is a diagram of inflatable, deployable, additively manufactured spacecraft 520, 530, according to several embodiments. The spacecraft 520, 530 may be crewed or uncrewed and may be used for supporting in-orbit space services including manufacturing, power generation, metallic fuel recycling and storage in cislunar space, surface, sub-surface operations on the Moon, Mars and asteroids. The spacecraft 520, 530 may be powered by metallic fuel.

The spacecraft 520, 530 include an inflatable habitat 522, a capsule 523 and arrays of rectennas 524 and solar cells 525. The inflatable habitat 522 may be raised to orbit in a compact form and inflated to the final configuration shown.

The arrays of rectennas 524 and solar cells 525 may be additively manufactured in-space and may combined and joined and/or attached to the spacecraft 520, 530 while in orbit. Additive manufacturing of the arrays of rectennas 524 and solar cells 525 on the spacecraft 520, 530 may provide for a magnetically spin-stabilized spacecraft 520, 530 according to the position of the arrays 524, 525 and may further provide an interface on the spacecraft 520, 530 for additional construction to create larger systems as shown in FIG. 10B.

Figure 10B:
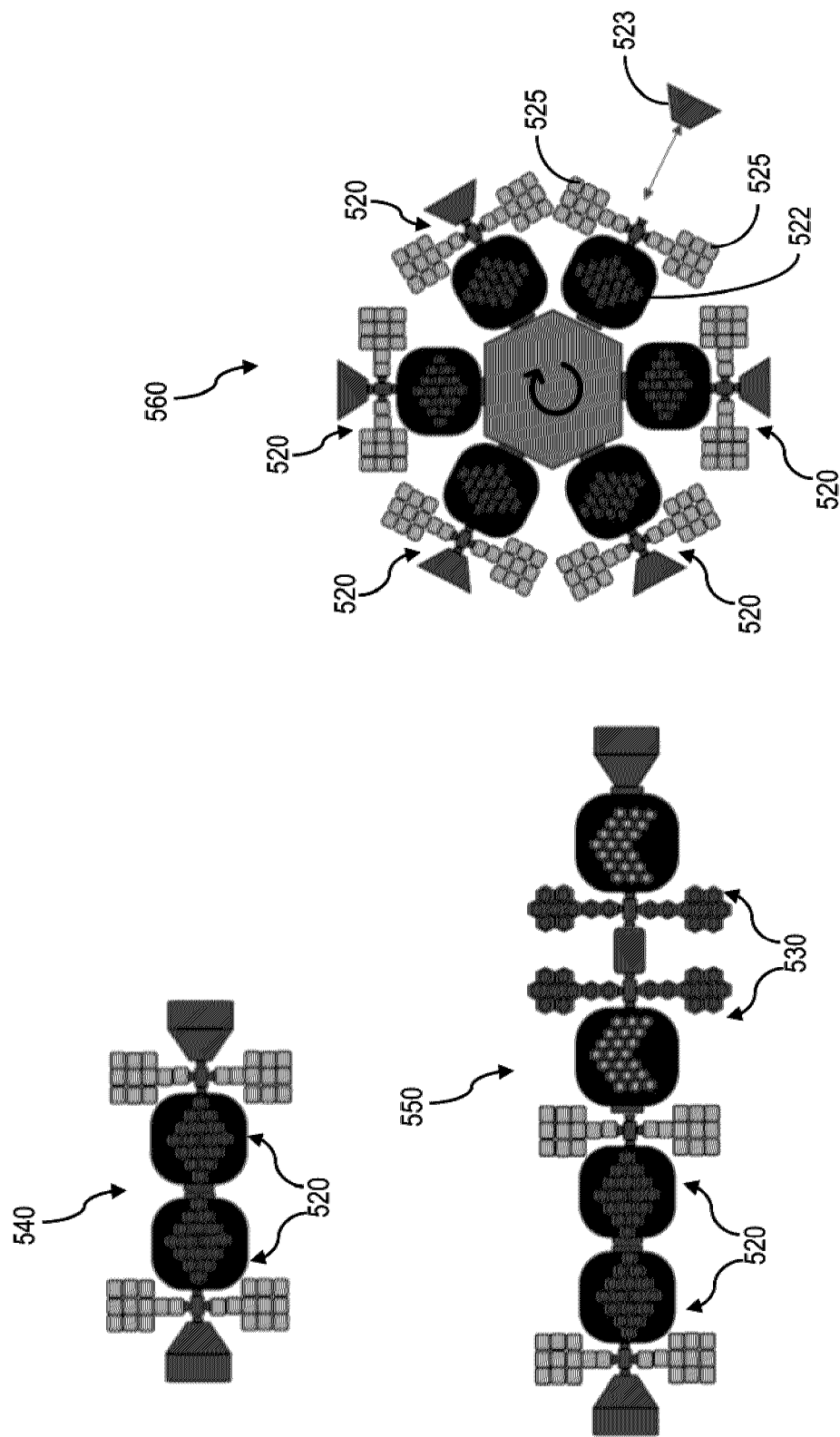
FIG. 10B is diagrams of larger assembled systems comprising the inflatable, deployable, additively manufactured spacecraft in FIG. 10A.

Referring to FIG. 10B, shown therein are larger assembled systems 540, 550, 560 comprising the inflatable, deployable, additively manufactured spacecraft 520, 530 in FIG. 10A, according to several embodiments. The assembled systems 540, 560 comprise subunits of inflatable, deployable spacecraft 520 joined together in spin stabilized configurations. The spacecraft 520 may be fully inflated/deployed prior to assembly into the larger systems 540, 550, or may be partially assembled and complete assembly when forming the larger system 560.

Figure 11A:
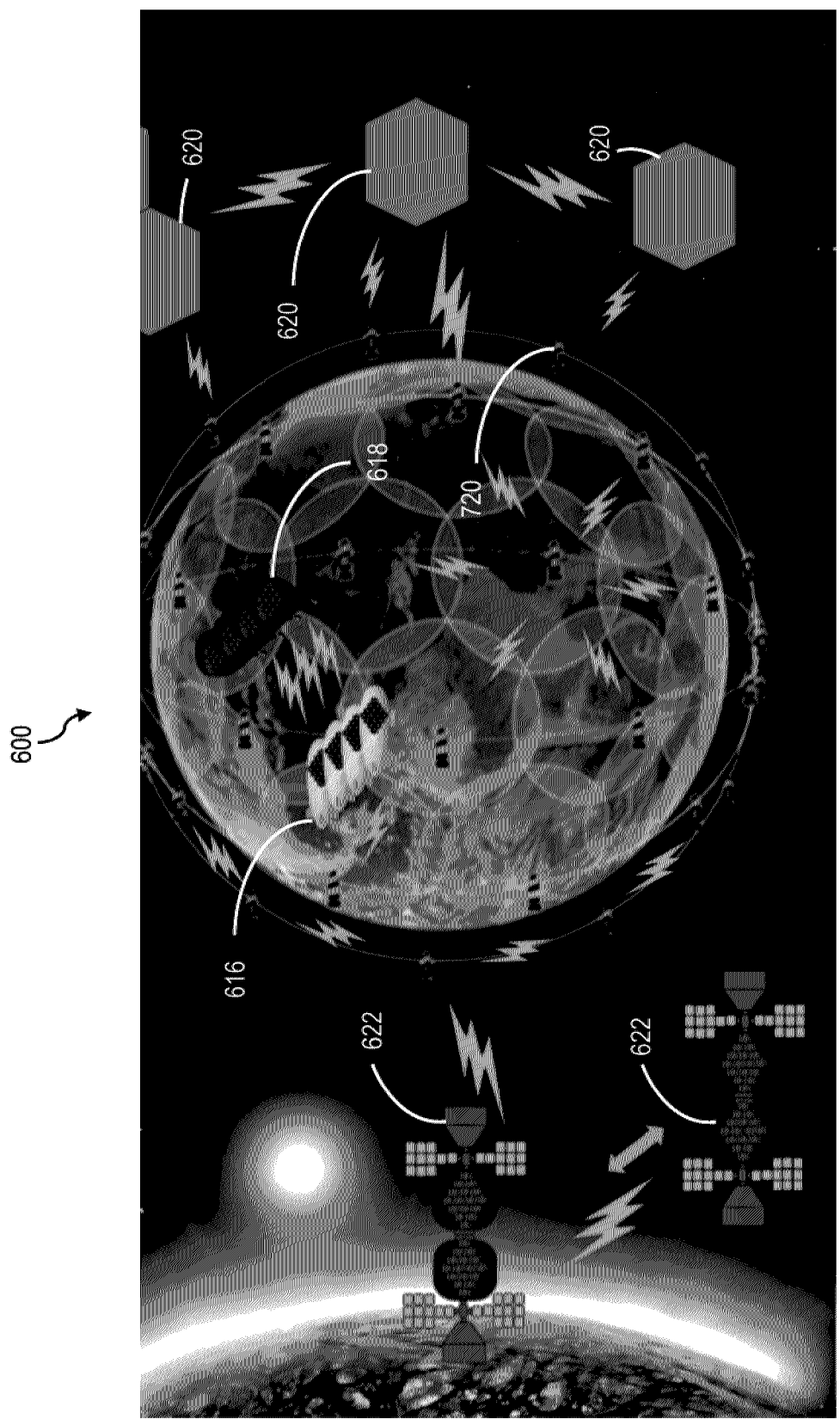
FIGS. 11A-11B are diagrams of a scalable network configuration for earth-to-space and space-to-earth point-to-point wireless power transmission, according an embodiment.
Figure 11B:
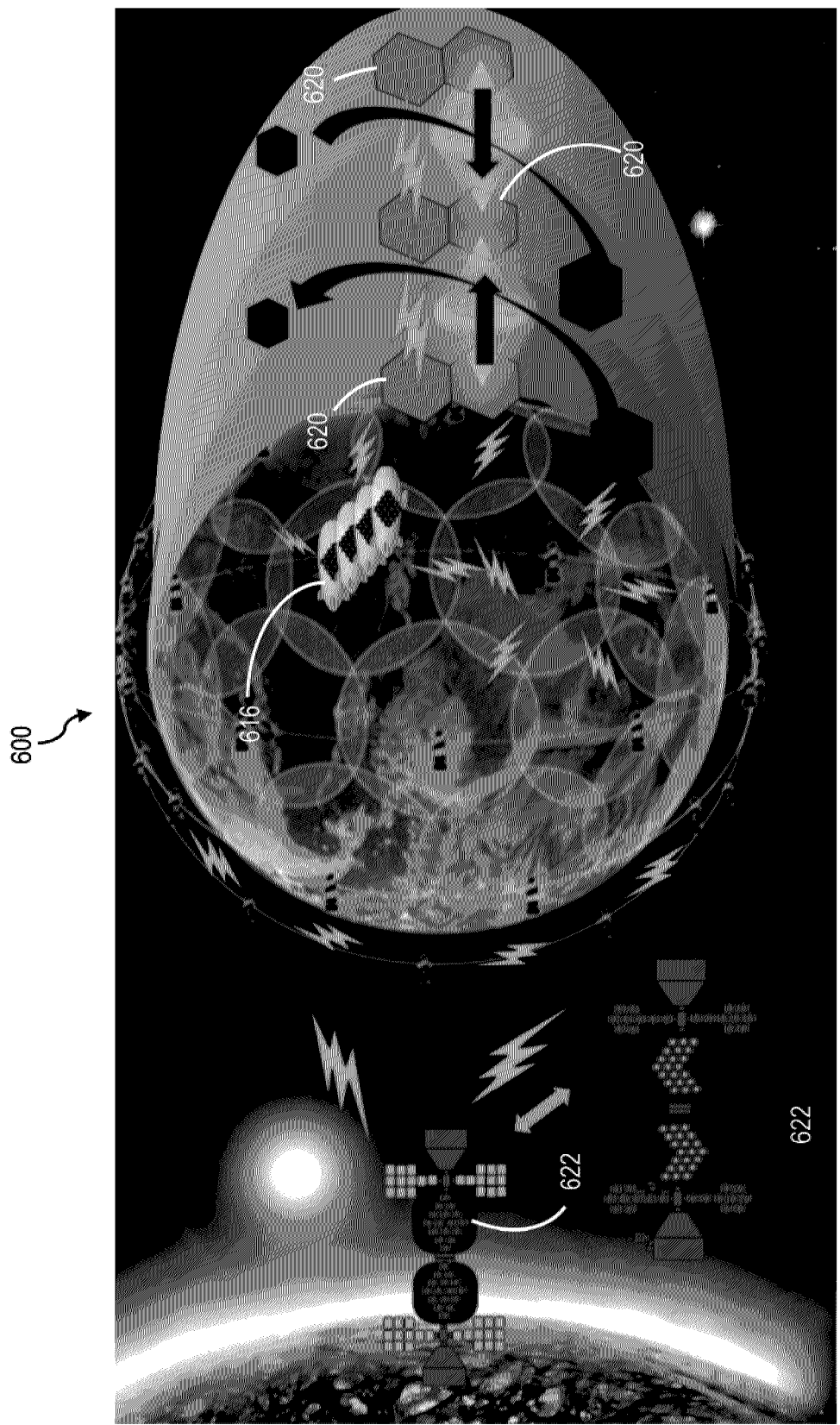

Referring to FIGS. 11A and 11B shown therein are diagrams of a scalable network configuration 600 for earth-to-space and space-to-earth point-to-point wireless power transmission, according to an embodiment. The scalable network 600 may comprise a plurality of craft, such as aerial and or spacecraft, including but not limited to airships 616, hot air balloons 618, satellites 620, and other spacecraft 622, such as a interplanetary spacecraft. Earth to space, and space to earth architectures can be rapidly deployed to support mission objectives, networks for wireless transfer of power for fuel recycling. Each craft may transfer wireless power to and from each other or to a ground station. The network 600 may be continuously managed, and dynamic, such that additional craft or ground stations may be added or removed, such that they are added removed to or from network 600 while network is operational, without disturbing the operation of the network 600.

Orbiting satellite 620 may alter orbit as pictured in 11B. Orbit may be raised or lowered, such that the satellite 620 may be placed at various orbit heights, such as to create an energy tunnel, wherein a craft may wirelessly receive power while within the energy tunnel. Orbit raising and descent can be achieved through the beam riding satellite and point to point power transfer methodologies. Space systems may also be augmented with heat exchangers for propulsion and power generation. Space systems have rectennas and/or solar cells for power generation. Other subsystems may be used for hybrid systems to augment the capabilities, such as storage, plasma confinement, thermal, nuclear, water-based systems, fuel recycling, etc.

Figure 12B:
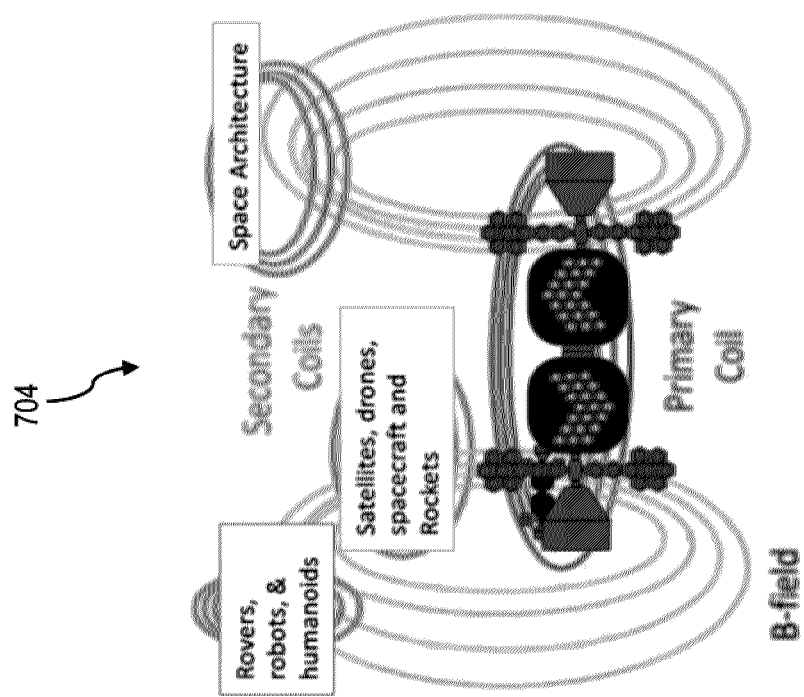

Referring to FIGS. 12A and 12B, shown therein are diagrams of in-orbit inductive-coupled magnetic resonance wireless power transfer systems 700, 702, 704, according to several embodiments. The systems are analogous to the wireless power transfer systems disclosed in PCT/CA2021/050985. Certain differences will be described. As the systems 700, 702, 704 are in orbit, the primary and secondary coils are located within satellites, spacecraft and/or space systems. The system 700, 702, 704 architectures may be augmented with other power beaming platforms including but not limited to low and high frequency microwaves, lasers, infrared, x-rays, and other EM radiation. Furthermore, the systems 700, 702, 704 may be shielded from space debris and/or harmful radiation by moving plasma within the magnetic field, B.

The systems 700, 702, 704 further include systems for metallic fuel recycling. Metallic fuel recycling may be powered by inductive-coupled magnetic resonance wireless power transfer or other radiative power beaming between spacecraft for energy distribution. In addition, the systems 700, 702, 704 may include thermal power plants to combust metallic fuel to generate power for operation. The power generated by combustion of metallic fuel may be stored and wirelessly transmitted to other spacecraft or satellites by inductive-coupled magnetic resonance.

Figure 13A:
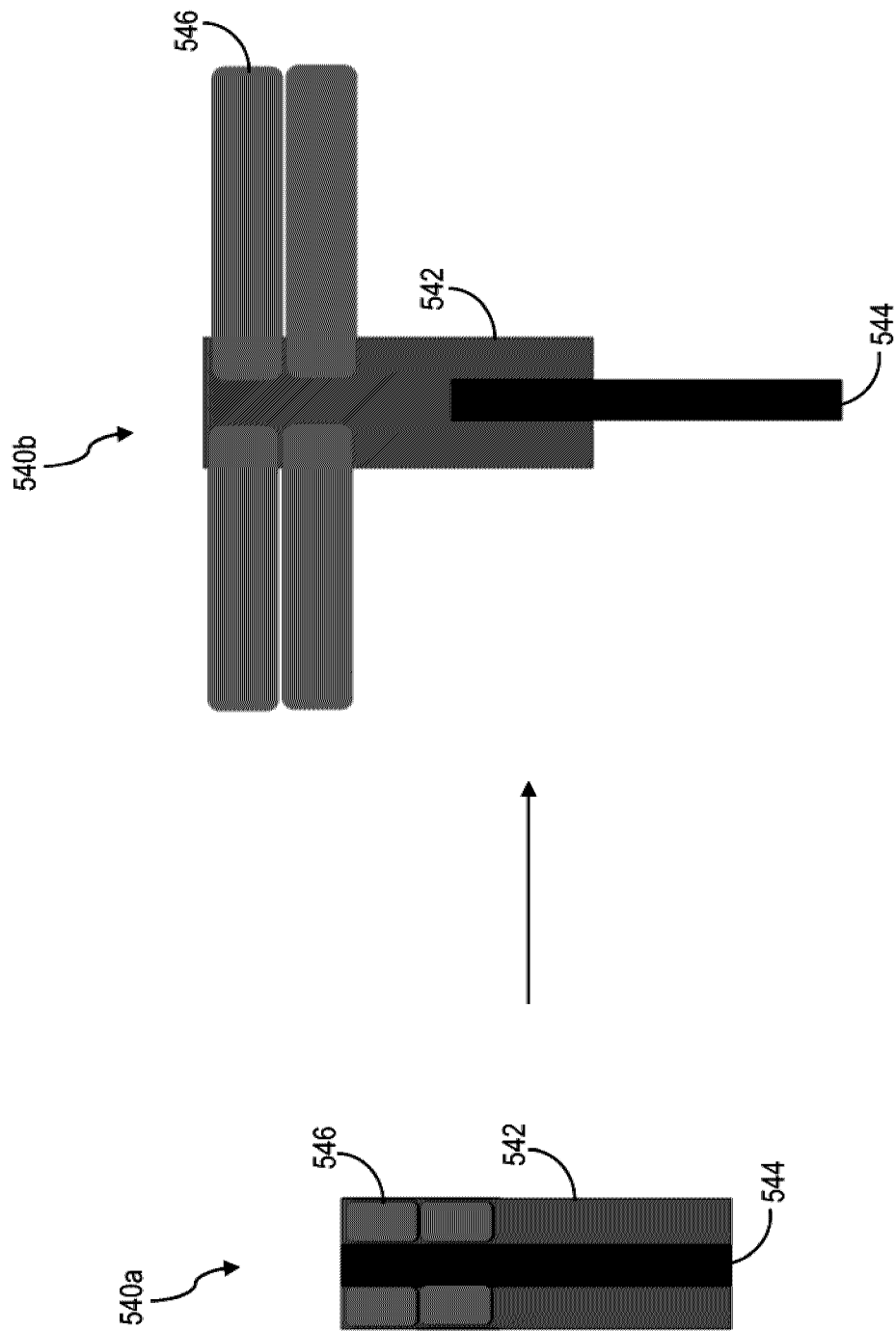
FIGS. 13A-13B are diagrams of inflatable, deployable space systems for metallic fuel storage and recycling according to several embodiments.
Figure 13B:
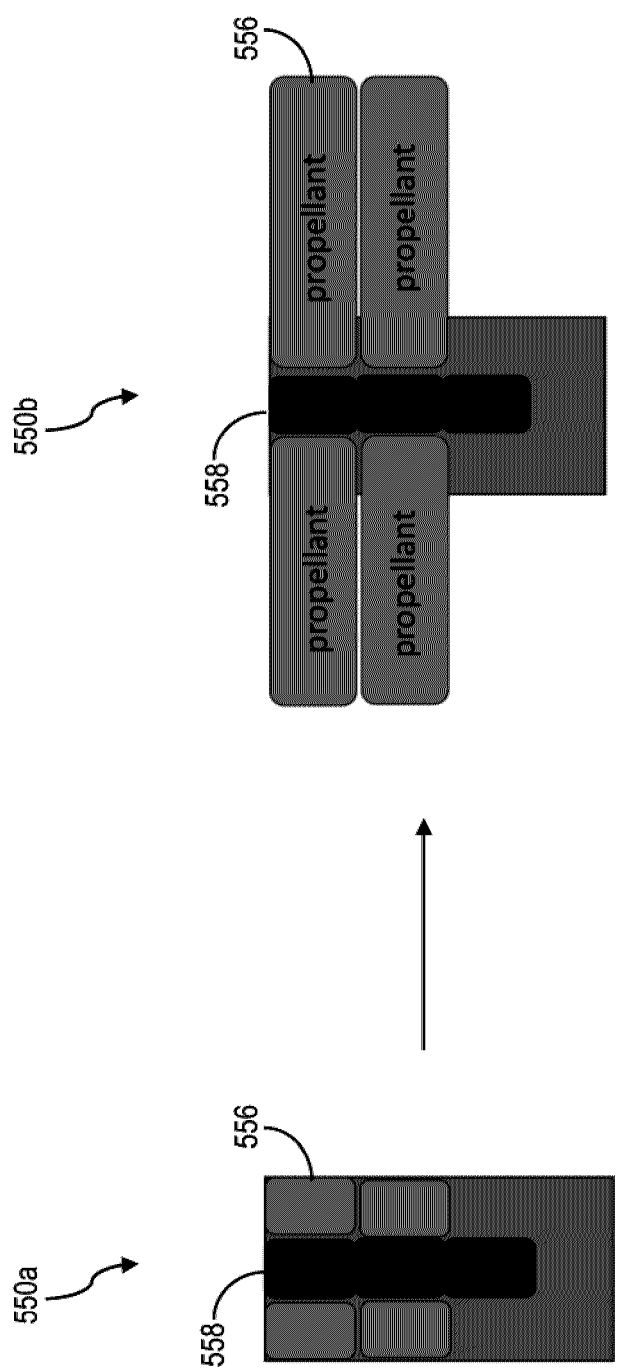

Referring to FIGS. 13A and 13B, shown therein are diagrams of inflatable, deployable space systems 540, 550 for metallic fuel storage and recycling according to several embodiments.

FIG. 13A shows an inflatable, deployable system 540 in a compact configuration 540a for transport to space and a deployed configuration 540b once in orbit. The system 540 includes a spacecraft/satellite body 542 housing a deployable component 544 and inflatable modules (one representative inflatable module 546 is shown). The deployable component 544 may be deployed from an interior of the spacecraft/satellite body 542 into space once the space system 540 is in orbit. Similarly, once in orbit, the inflatable modules 546 may be inflated with a gas, liquid or solid causing the inflatable module 546 to expand. Upon expansion, the inflatable modules 546 may expand beyond the body 542 into the surrounding space. The space system 540 may be spin stabilized upon deployment of the deployable component 544 and inflation of the inflatable modules 546. An exterior surface of the inflatable modules 546 may be constructed of a rectenna material and/or comprise solar cells.

Referring to FIG. 13B, shown therein is an inflatable metallic fuel propellant depot 550, shown in a compact transport configuration 550a and a deployed configuration 550b. The propellant depot 550 includes inflatable modules 556 may store metallic fuel propellant (e.g., microthermite or nanothermite powder) as an inflatable "battery". According to other embodiments, the inflatable modules 556 may store other materials, such as regolith collected from an extraterrestrial source. The propellant depot 550 includes a docking interface 558 for assembling two or more propellant depots 550 into an assembled system.

The inflation of the inflatable modules 556 may be driven by a catalytic reaction. For example, nanothermites may be mixed with a catalyst within the inflatable module 556 to produce gaseous, liquid or solid products and byproducts in a varied microgravity in space. The accumulation of the products and byproducts of the reaction cause expansion of the inflatable modules 556 which then stores the metallic fuel propellant that is created from the catalytic reaction.

Figure 13C:
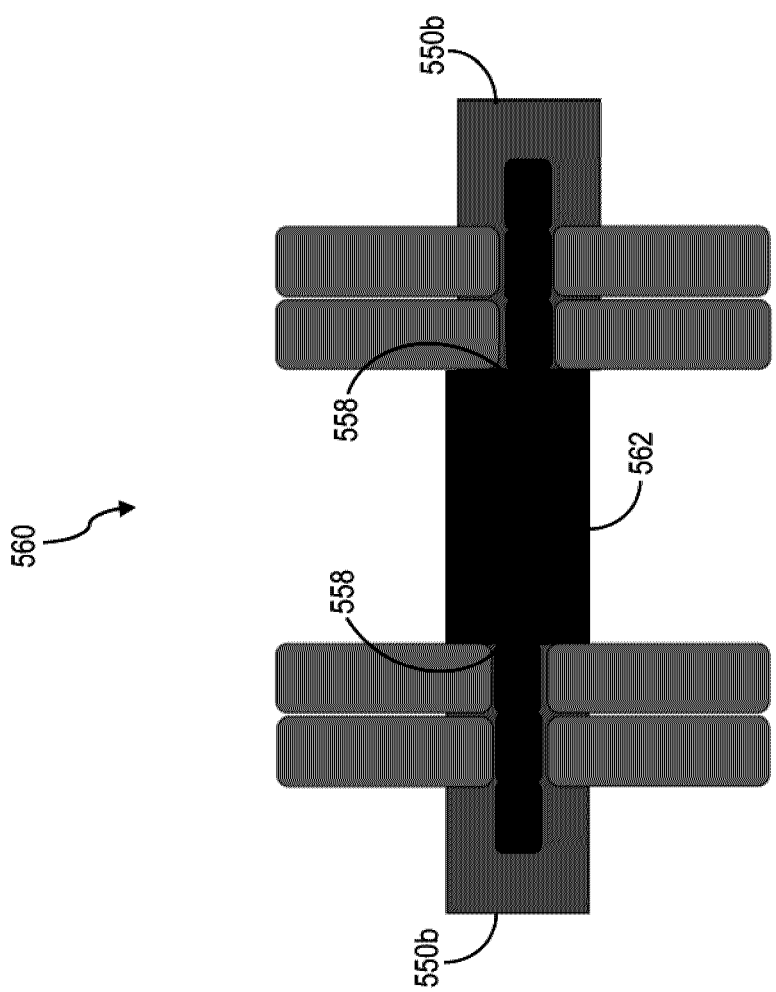
FIG. 13C is a diagram of an assembled system from the inflatable, deployable space system of FIG. 13B, according to an embodiment.

Referring to FIG. 13C, shown therein is an assembled system 560 constructed from inflatable, deployable propellant depot 550b in FIG. 13B. The assembled system 560 includes two inflatable, deployable propellant depot 550b subunits joined by a docking subunit 562. The inflatable, docking interfaces 558 on the inflatable, deployable propellant depots 550b connect to the docking subunit 562 in a correct orientation such that the formed assembled system 560 is spin stabilized.

Figure 14:
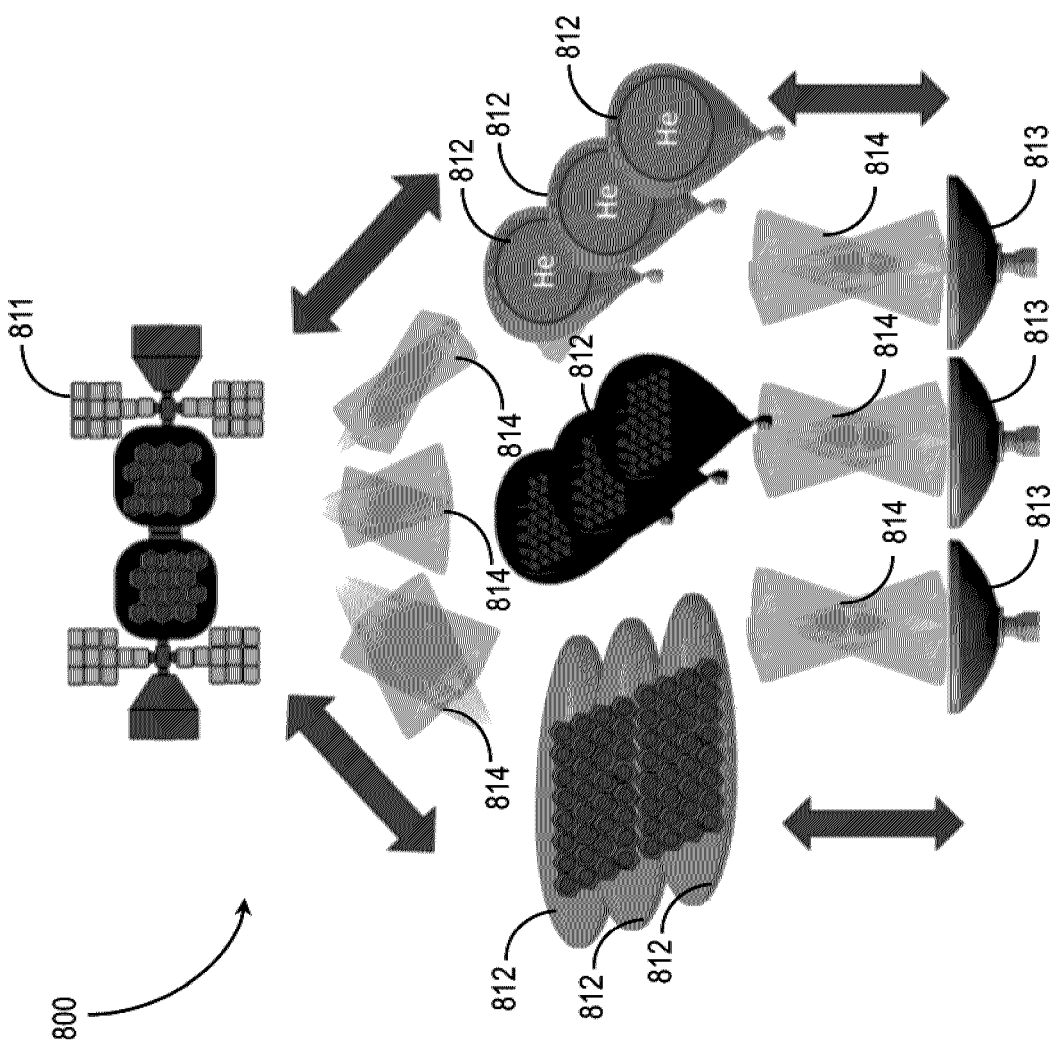
FIG. 14 is a diagram of a recyclable fuel powered satellite propulsion and elevator system 800, according to an embodiment.

Referring to FIG. 14, shown therein is a diagram of a recyclable fuel powered satellite propulsion and elevator system 800, according to an embodiment. The system 800 includes one or more satellites 811 in orbit at an altitude above the Earth. The system 800 includes one or more aerial craft 812 (e.g., airships or balloons) positioned or tethered at an intermediate altitude in atmosphere. The satellites 811 and aerial craft 812 include thermal power plants to combust metallic fuel for propulsion and provide energy to power onboard systems.

The system 800 includes ground-based parabolic EM radiation transmitters 813. The satellites 811 and aerial craft 812 include arrays of EM radiation transmitters and receivers (including rectennas) to establish beam riding highways 814 in a generally vertical direction from the ground up to space. The EM radiation transmitters and receivers may be powered by energy generated by the combustion of metallic fuel.

A fleet of satellites 811 or aerial craft 812 may be used to increase the availability of power in the beam riding highways 814 from the ground to space. Other aerial craft (not shown) may enter the beam riding highways 814 and use the local available power for propulsion to change altitude (up or down) and position (side to side) within the beam riding highways 814.

Figure 15:
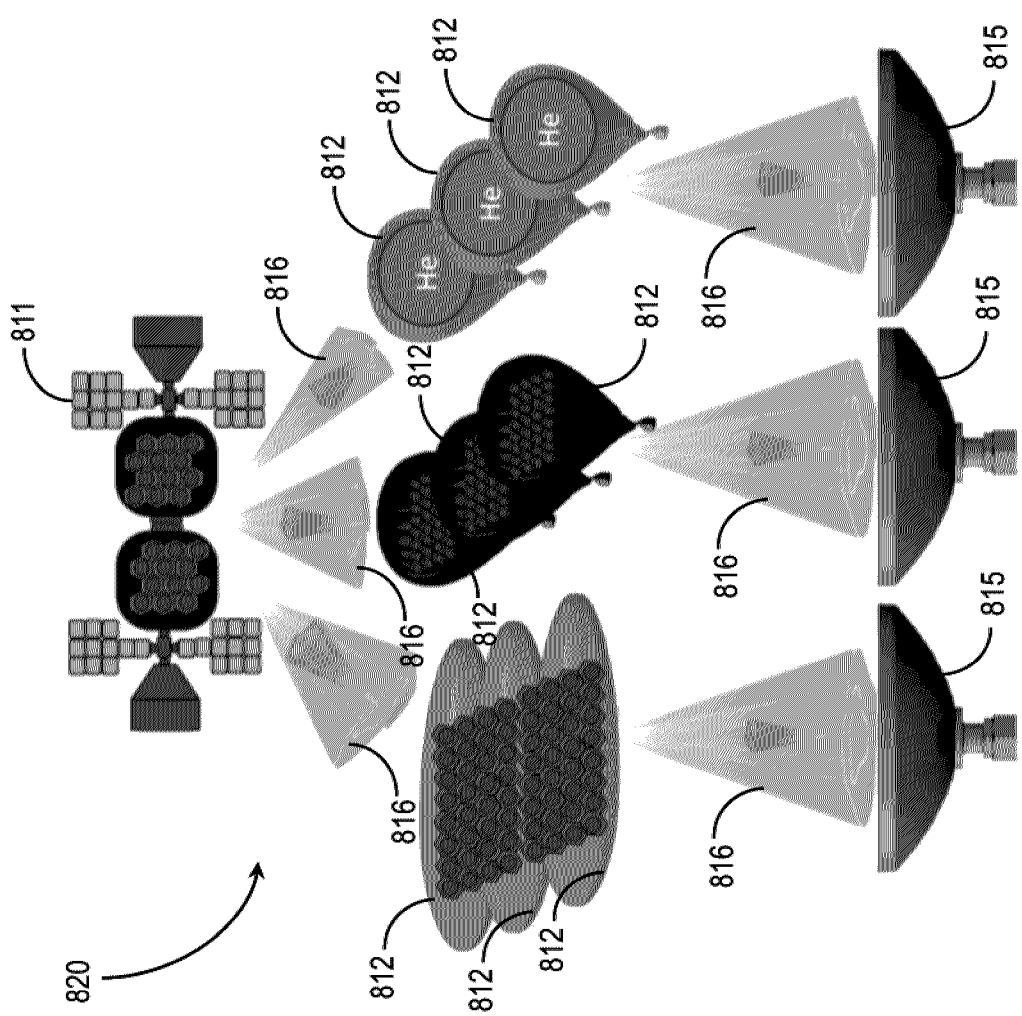
FIG. 15 a recyclable fuel powered space-to-earth wireless power and data transmission system, according to an embodiment.

Referring to FIG. 15, shown therein is a diagram of a recyclable fuel powered space-to-earth wireless power and data transmission system 820, according to an embodiment. The system 820 is substantially similar to the system 800 (FIG. 14) and includes one or more satellites 811 in orbit. The satellites 811 include a thermal power plant to combust metallic fuel for propulsion and provide energy to power onboard systems.

The satellites 811 include transmitters to beam EM radiation 816 down toward the earth from the power generated by the solar cells. The system 820 includes one or more aerial craft 812 positioned or tethered at an intermediate altitude. The aerial craft 812 include arrays of EM radiation transmitters and receivers (including rectennas). The aerial craft 812 receive the radiation 816 beamed down from the satellite 811 and retransmit the radiation 816 downward toward the earth. The system 820 includes ground-based parabolic receivers 815 to collect the EM radiation 816 beamed down from the aerial craft 812. The parabolic receivers 815 may include rectenna arrays to convert the received radiation 816 to electricity for use on the ground.

Figure 16:
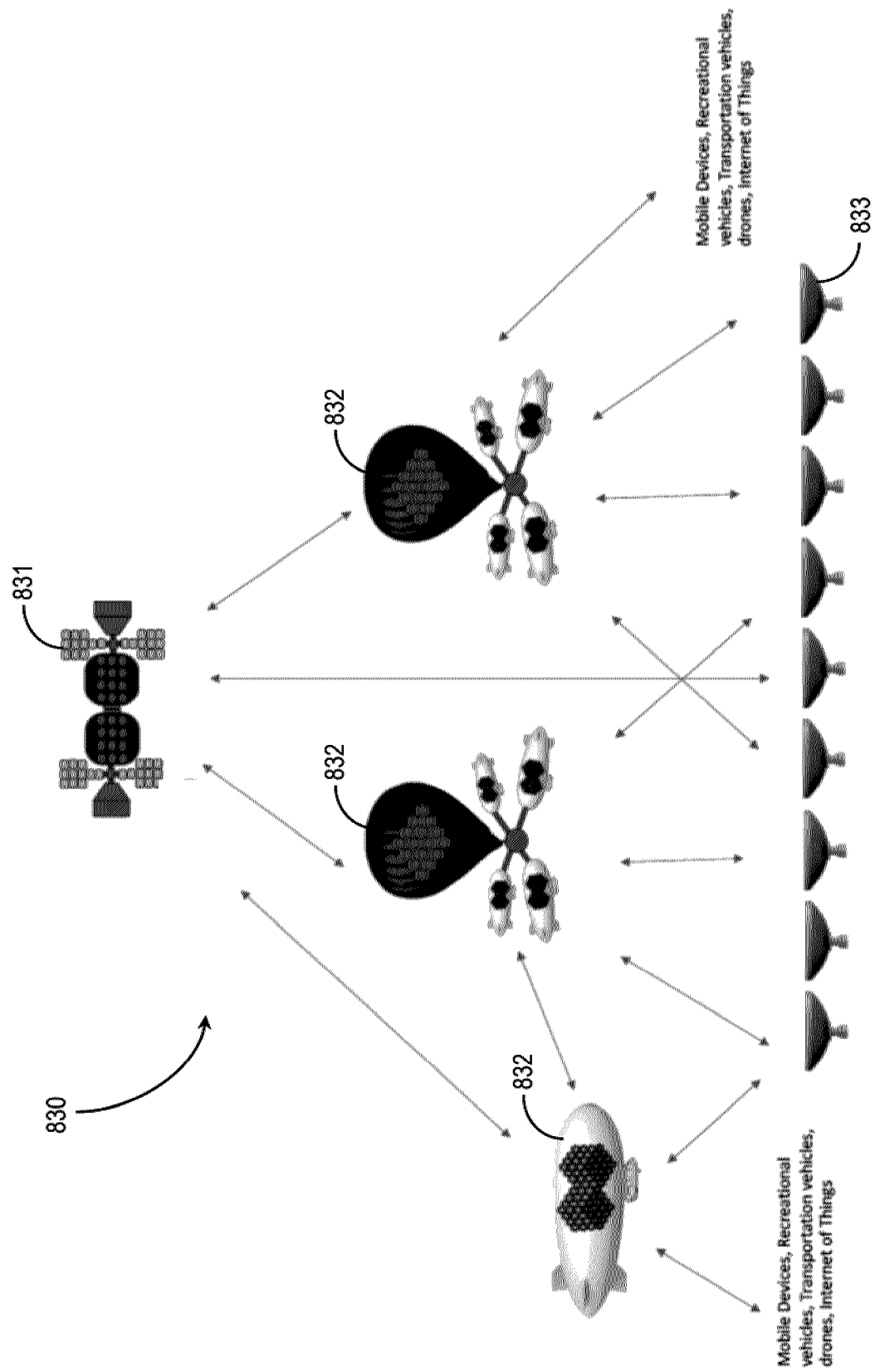
FIG. 16 is a diagram of a deployable data hub system for use in point-to-point data transmission, according to an embodiment.

Referring to FIG. 16, shown therein is a diagram of a deployable data hub system 830 for use in point-to-point data transmission, according to an embodiment. The system 830 includes a constellation of satellites 831, a fleet of aerial craft 832 and ground stations 833. The satellites 831 include a thermal power plant to combust metallic fuel for propulsion and provide energy to power onboard systems.

In conventional systems wherein data is beamed directly from satellites 831 to ground stations 833, the satellite 831 must be in range (i.e., above the ground station 833) for successful data transmission. Compared to conventional systems, the system 830 is advantageous to provide an intermediary data hub in the fleet of aerial craft 832 to relay signals between the satellite 831 and the ground stations 833. Accordingly, a satellite 431 need not be in direct range of a ground station 833 for successful data transmission and may transmit or receive data via the aerial craft 832 data hub. A further advantage is that data received from the satellite 831 may be transmitted directly from the aerial craft 832 data hub to IoT devices (not shown) rather than having to pass through a ground station 833 first.

Figure 17:
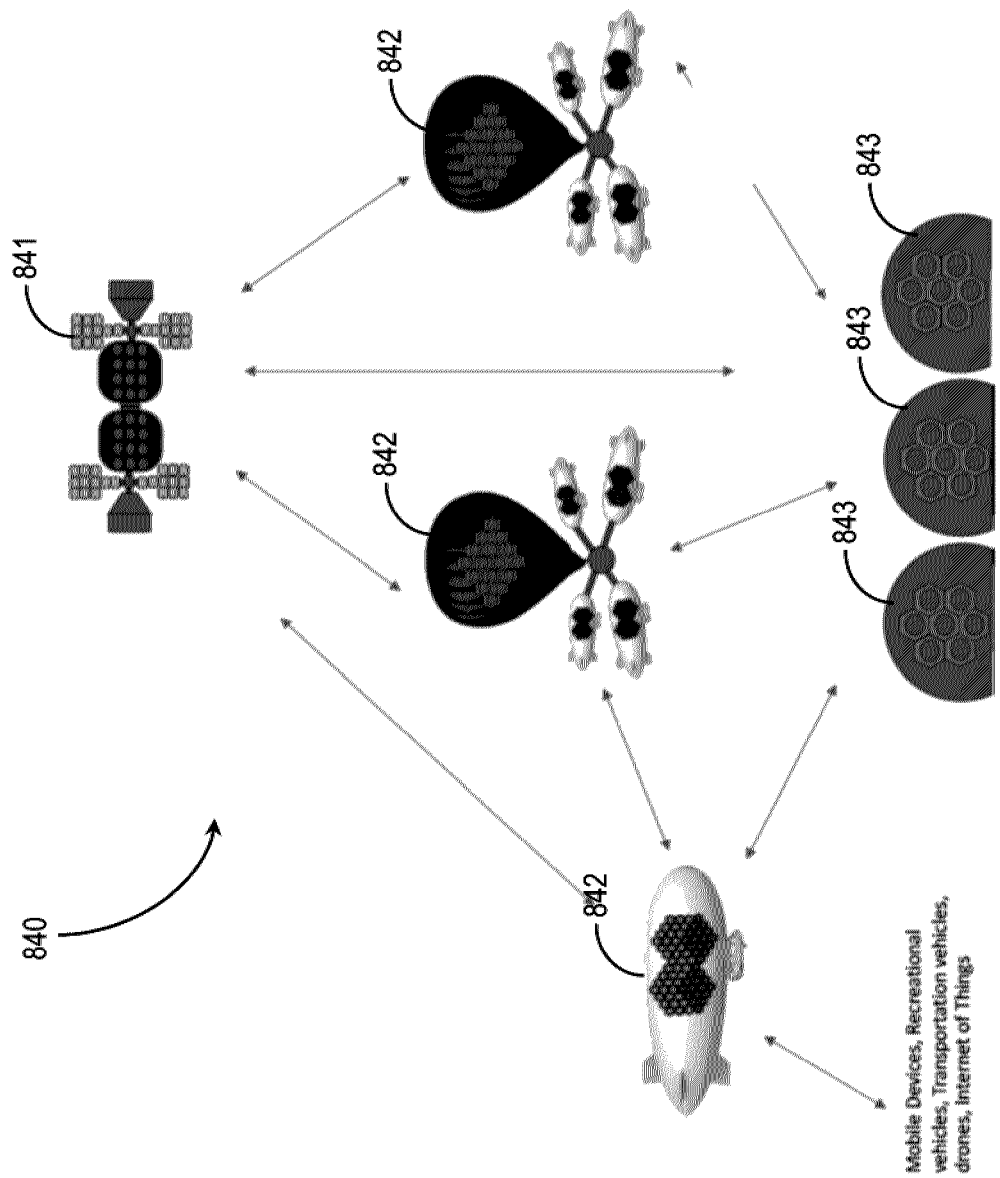
FIG. 17, is a diagram of a rapidly deployable power hub system for use in point-to-point wireless power transmission, according to an embodiment.

Referring to FIG. 17, shown therein is a diagram of a rapidly deployable power hub system 840 for use in point-to-point wireless power transmission, according to an embodiment. The system 840 includes a constellation of satellites 841, a fleet of aerial craft 842 and deployable ground stations 843. The satellites 841 include a thermal power plant to combust metallic fuel for propulsion and provide energy to power onboard systems. The satellites 841 include transmitters to beam EM radiation down toward the earth from the power generated by the combustion of metallic fuel. The fleet of aerial craft 842 are positioned or tethered at an intermediate altitude between the satellite 841 and ground stations 843. The aerial craft 842 include arrays of EM radiation transmitters and receivers (including rectennas). The aerial craft 842 receive the radiation beamed down from the satellite 841 and retransmit the radiation downward toward the earth.

The deployable ground stations 843 may be additively manufactured, deployable structures to house personnel, and other materials. The deployable ground stations 843 include arrays of rectennas to collect the radiation beamed downward from the aerial craft 842. The deployable ground stations 843 are preferable dome shaped to provide maximal area for deployment of the arrays of rectennas to receive beamed radiation from the aerial craft. The system 840 may be advantageously used to generate power in remote areas where power availability is low or when a local electrical grid is down. Alternatively, the system 840 may be used to augment available energy.

It should be noted that the systems shown in FIGS. 14-17 may be implemented for ground-to-space or space-to-ground power and data transmission on any planetary or astronomical body of sufficient size, including, but not limited to the Earth, the Moon, Mars, and asteroids. In addition, in embodiments wherein energy is transmitted from the ground up to satellites, a ground thermal power plant may combust metallic fuel to generate power which is transmitted upward.

Figure 18A:
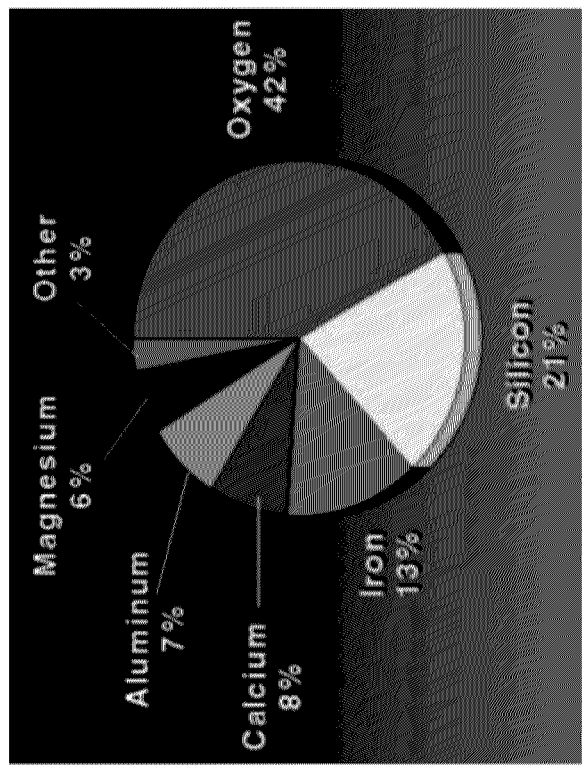
FIGS. 18A-18C are graphs of the material content of Lunar soil, Martian soil and Martian regolith simulant, respectively.
Figure 18C:
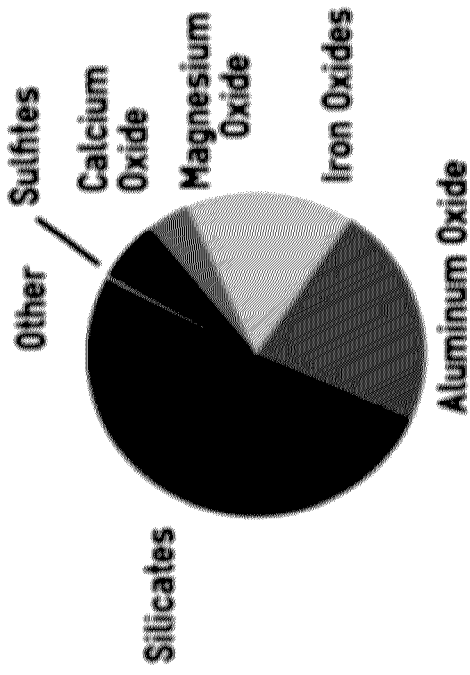
Figure 18B:
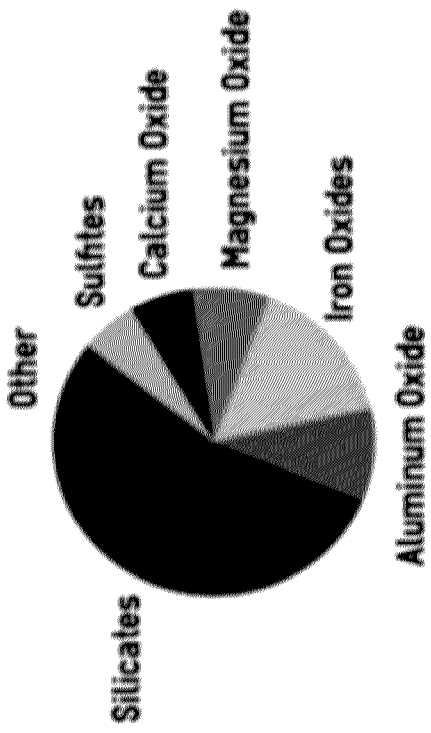

Referring to FIGS. 18A-18C, shown therein are graphs of the material content of Lunar soil, Martian soil and Martian regolith simulant, respectively. The inner planets (Mercury, Venus, Earth and Mars) have a similar material makeup since they were formed by similar processes. The crust of Mars (FIG. 18B), much like Earth (FIG. 18A) is mostly igneous rock similar to Basalt. Accordingly, sources of rock on Earth may be selected and crushed to a fine powder (grains <5 mm in diameter) to form a regolith simulant (FIG. 18C) to mimic the material composition of Mars. Such a regolith simulant may be processed into metallic fuel to support in-situ (in-space) resource utilization.

Figure 19B:
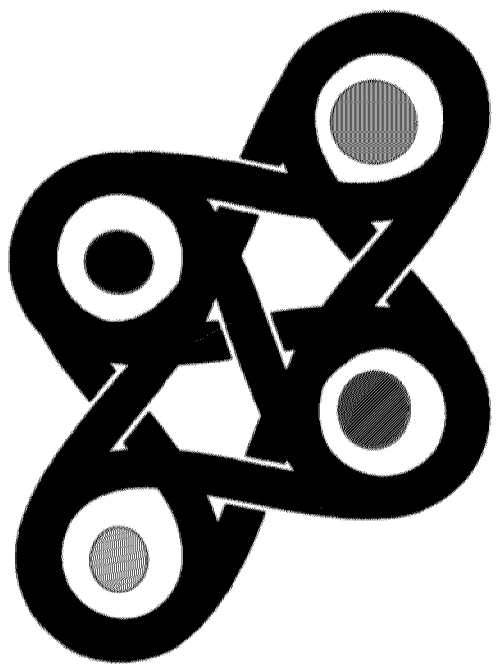
FIGS. 19A-19B are diagrams of cycler systems implementing metallic fuel recycling, according to several embodiments.

Similarly, regolith mined from other astronomical bodies such as asteroids may be processed in-space for use as a metallic fuel to drive processes to support the space economy, rather than relying on earth-based fuel. For example, regolith harvested in-space may be processed into metallic fuel for in-space power generation to support travel and construction on the Moon, Mars, asteroids and other astronomical bodies. The metallic fuel byproducts may be captured and recycled into metallic fuel, thus providing a stable source of in-space power generation rather than using earth-based fuel and/or fuel sources. Advantageously, this may allow for longer space travel, cycler transport between two points in space as shown in FIGS. 19A-19B, and looping applications to conserve fuel during spaceflight.

In other implementations, collaborative robotics are used to dismantle, use, and recycle materials and or energetic particles. Where swarms of robots are used to dismantle and construct new space infrastructure to support in-space application including recycling systems. In addition, existing space assets can be recycled and turned into useful byproducts by undergoing additional processes, additive manufacturing and/or in orbit servicing. Robotics will include autonomous navigation and control, swarm intelligence, collaborative planning and scheduling, additionally artificial intelligence and or other machine learning algorithms may be applied to increase autonomy and continually learn from space operations.

Figure 19A:
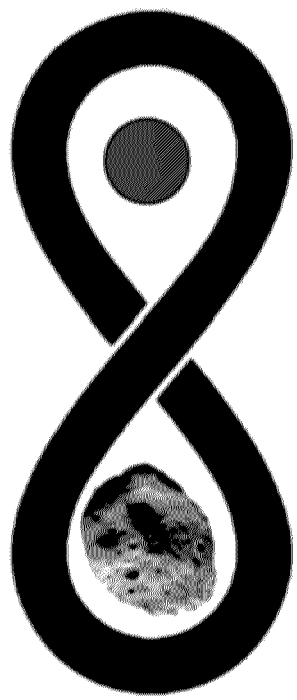

Referring to FIG. 19A, shown therein is a diagram of a cycler transport system 900 between two planetary bodies. Conventional space propulsion systems typically only enable one-way travel to distant astronomical bodies due to depletion of fuel reserves carried onboard. Using the systems and methods disclosed herein may advantageously facilitate cycler transport along a figure eight trajectory between two planetary bodies by recycling metallic fuel onboard, thereby conserving onboard fuel reserves. Thus, a cycler transport system using recycled metallic fuel may extend a one-way trip into a return trip. Generally, cycler transport by recycling fuel may be possible between any two or more astronomical bodies as shown in FIG. 19B. Spacecraft may also land on an astronomical body to "refuel" by harvesting regolith for processing into metallic fuel to extend a trip, rather than having to return to Earth for refueling.

Further efficiencies in fuel conservation may be achieved by implementing "looping". In a looping method, a spacecraft's rocket engine is combined (or operably connected) with a thermal power plant to operate in two phases—a propulsion phase and a power phase. During the propulsion phase metallic fuel (e.g., thermites) are ignited, combusted, and expelled from the engine to provide propulsion. By leveraging dispersion techniques which utilize the balance between the concentration of the particles in the carrier fluid and the concentration of the heat and energy required for ignition, a variable fraction of the metallic fuel can be combusted in a loop, and the unburnt fuel that is heated by the combustion is captured to inductively generate electricity in the thermal power plant during the power phase. The unburnt fuel is then be looped back to the engine for combustion in the next propulsion phase.

The degree of combustion during the propulsion phase may be controlled by volumetric heating of the metallic fuel to optimize the looping method for propulsion vs. power generation for a given "loop" of metallic fuel usage. For example, when rapid propulsion is required, a first loop will produce complete combustion (no unburn fuel left to be captured), and a second loop will also produce complete combustion. By contrast when both propulsion and power generation is required, a first loop will result in complete combustion and a second loop will result in less than complete combustion whereby the unburnt fuel is captured by a sintering process to generate power thought induction. When only power generation is required (without propulsion) the fuel may be inductively heated by sintering to generate power in the thermal power plant.

According to various embodiments, other looping processes may include the utilization of nanothermites to generate power and propulsion, and the products harvested for use to drive other processes and reactions such as to create other byproducts, further reduced metal oxides to synthesize metallic fuels, further oxidize metal fuels for power and propulsion generation, and recycle, and reuse the byproducts.

While the above description provides examples of one or more apparatus, methods, or systems, it will be appreciated that other apparatus, methods, or systems may be within the scope of the claims as interpreted by one of skill in the art.

The invention claimed is:

1. A method for recycling metallic fuels, comprising:
   capturing fuel products and unburnt fuel from heating and/or combustion of a metallic fuel, wherein the fuel products include a metal product;
   directing the unburnt metallic fuel and the fuel products to storage and/or further oxidation to generate power and/or thrust; and
   recycling the metal product to create the metallic fuel.

2. The method of claim 1, further comprising:
   inductively generating electricity using waste heat from the unburnt metallic fuel and the fuel products.

3. The method of claim 1, further comprising:
   recycling the fuel products by one or more chemical processes to produce a byproduct.

4. The method of claim 3, wherein the chemical processes include one or more of: hydrogenation, methanation, carbothermal reduction and electrolysis.

5. The method of claim 1, wherein the metallic fuel comprises a metal and an oxidizer.

6. The method of claim 5, wherein the oxidizer is a metal oxide.

7. The method of claim 6, wherein the metallic fuel is one of: a nanothermite, a microthermite and thermite.

8. The method of claim 1, wherein the fuel products further include a metal that is oxidizable for heating and/or combustion.

9. The method of claim 1, wherein the metallic fuel is heterogeneous comprising metallic particulates surrounded by a binder.

10. The method of claim 9, wherein the binder is a nanocomposite hydrogel, a metamaterial, or a combination thereof.

11. The method of claim 1, wherein the metallic fuel is heterogeneous comprising metallic particles and a catalyst for catalytic oxidation of the metallic particles or catalytic reduction of the fuel products.

12. The method of claim 11, wherein the catalyst is stimuli-responsive being chemically, mechanically, electromagnetically, magnetically or thermally activatable.

13. The method of claim 3, further comprising providing energy for the one or more chemical processes by inductive-coupled and/or magnetic resonance wireless energy transmission.

14. The method of claim 1, further comprising synthesizing the metallic fuel in-situ from a plurality of fuel sources in space, the fuel sources comprising space debris, space systems and/or regolith from planets, asteroids, planetoids, other celestial bodies, or a combination thereof.

15. The method of claim 1, further comprising controlling volumetric heating of the metallic fuel to regulate the combustion in a heat engine.

16. A system for propulsion and power generation using a metallic fuel, comprising:
   at least one combustion chamber for heating and/or combusting the metallic fuel to provide propulsion;
   at least one reaction chamber for generating electricity and thermal power using waste energy from unburnt metallic fuel and fuel products;
   at least one storage system for capturing the unburnt metallic fuel and the fuel products; and
   a first recycling system for directing the captured unburnt metallic fuel and/or the fuel products from the storage system to the combustion chamber and/or the reaction chamber.

17. The system of claim 16, further comprising a second recycling system for directing the fuel products to a second reaction chamber for processing the fuel products into byproducts.

18. The system of claim 16 wherein the at least one reaction chamber integrates a thermophotovoltaic system to convert energy from the unburnt fuel and the fuel products into electricity.

19. The system of claim 17, wherein the second reaction chamber further reduces the fuel byproducts by one or more reductive processes to synthesize the metallic fuel.

20. The system of claim 16, further comprising a processing system for synthesizing the metallic fuel in-situ from a plurality of fuel sources in space, the fuel sources comprising space debris, space systems and/or regolith from planets, asteroids, planetoids, other celestial bodies, or a combination thereof.

* * * * *